United States Patent
Wang et al.

(10) Patent No.: US 11,382,046 B2
(45) Date of Patent: Jul. 5, 2022

(54) POWER CONTROL METHOD AND COMMUNICATION APPARATUS

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/620,629

(22) PCT Filed: Jul. 10, 2017

(86) PCT No.: PCT/CN2017/092408
§ 371 (c)(1),
(2) Date: Dec. 9, 2019

(87) PCT Pub. No.: WO2019/010618
PCT Pub. Date: Jan. 17, 2019

(65) Prior Publication Data
US 2020/0205086 A1 Jun. 25, 2020

(51) Int. Cl.
*H04W 52/00* (2009.01)
*H04W 52/28* (2009.01)
(Continued)

(52) U.S. Cl.
CPC ........ *H04W 52/281* (2013.01); *H04B 17/318* (2015.01); *H04W 52/0261* (2013.01); *H04W 52/243* (2013.01)

(58) Field of Classification Search
CPC ........... H04W 52/281; H04W 52/0261; H04W 52/243; H04W 52/46; H04W 52/242; H04B 17/318
See application file for complete search history.

(56) References Cited

U.S. PATENT DOCUMENTS

2011/0026419 A1* 2/2011 Kim ................... H04W 52/281
370/252
2013/0324182 A1 12/2013 Deng et al.
(Continued)

FOREIGN PATENT DOCUMENTS

JP 2015-519028 A 7/2015
JP 2017-534202 A 11/2017
(Continued)

OTHER PUBLICATIONS

The Extended European Search Report dated May 27, 2020 for the related European Patent Application No. 17917436.2, 11 pages.
(Continued)

*Primary Examiner* — Md K Talukder
(74) *Attorney, Agent, or Firm* — Seed IP Law Group LLP

(57) ABSTRACT

There are provided a communication apparatus and a method. The communication apparatus comprising: a circuitry operative to determine respective priorities of a plurality of target receivers to which data is transmitted, and assign power for transmitting the data at least according to a power loss feature related to a particular target receiver of which the priority is the highest or is higher than a power threshold; and a transmitter, operative to transmit, to the plurality of target receivers, the data with the assigned power.

20 Claims, 14 Drawing Sheets

(51) Int. Cl.
  *H04B 17/318* (2015.01)
  *H04W 52/02* (2009.01)
  *H04W 52/24* (2009.01)

(56) References Cited

U.S. PATENT DOCUMENTS

| | | | |
|---|---|---|---|
| 2016/0014790 A1* | 1/2016 | Takehana | H04W 72/085 370/329 |
| 2016/0066336 A1* | 3/2016 | Sevindik | H04W 40/22 370/315 |
| 2016/0105853 A1* | 4/2016 | Zhao | H04W 24/08 370/311 |
| 2016/0219601 A1* | 7/2016 | Lin | H04L 5/0044 |
| 2016/0330696 A1 | 11/2016 | Suzuki et al. | |
| 2016/0381672 A1* | 12/2016 | Kim | H04W 52/383 370/329 |
| 2017/0041882 A1* | 2/2017 | Chae | H04W 52/36 |
| 2017/0318586 A1* | 11/2017 | Wang | H04W 72/0453 |
| 2018/0041889 A1* | 2/2018 | Chen | H04W 92/18 |
| 2018/0070264 A1* | 3/2018 | Saiwai | H04W 72/04 |
| 2018/0132254 A1* | 5/2018 | Chae | H04W 72/0453 |
| 2020/0205086 A1* | 6/2020 | Wang | H04W 52/243 |
| 2020/0413348 A1* | 12/2020 | Ryu | H04W 52/383 |

FOREIGN PATENT DOCUMENTS

| | | |
|---|---|---|
| WO | 2016/070352 A1 | 5/2016 |
| WO | 2016/070637 A1 | 5/2016 |
| WO | 2016/181547 A1 | 11/2016 |

OTHER PUBLICATIONS

International Search Report of PCT application No. PCT/CN2017/092408 dated Mar. 29, 2018.

Intel Corporation, "Sidelink Power Control for Wearable and IoT Use Cases," R1-1707334, Agenda Item: 6.2.9.2.3.3, 3GPP TSG RAN WG1 Meeting #89, Hangzhou, P.R. China, May 15-19, 2017, 4 pages.

* cited by examiner

POWER CONTROL METHOD AND COMMUNICATION APPARATUS

CROSS-REFERENCE TO RELATED APPLICATIONS

This application is a U.S. national stage application of the PCT International Application No. PCT/CN2017/092408 filed on Jul. 10, 2017, the contents all of which are incorporated herein by reference.

BACKGROUND

1. Technical Field

The present technology relates to wireless communication field, and more particular, to a communication apparatus and a method for controlling power for transmitting data to multiple target receivers.

2. Description of the Related Art

Further enhancement of device to device (FeD2D) is a work item targeting for optimizing communications between wearable devices/internet of things (IoT) devices and relay user equipments (UEs). In FeD2D, a relay UE may communicate with multiple remote UEs (including IoT devices) simultaneously in a transmission time interval (TTI) for transmitting a subframe, each of which includes physical resource blocks (PRBs) targeting for respective remote UEs. For transmitting data allocated with different PRBs to different target receivers, the relay UE may assign respective powers for transmitting the data with allocated respective PRBs to ensure certain received powers at the remote UEs. In such case, differences among power spectral densities (PSDs) for transmitting the data may be relatively large due to different pathlosses between the relay UE and the respective remote UEs, and such differences may exceed radio frequency (RF) limitation of the relay UE, and may cause challenge to the relay UE's power control implementation.

SUMMARY

One non-limiting and exemplary embodiment facilitates eliminating PSD differences among PRBs, and performing power control efficiently.

In one general aspect, it is to provide a communication apparatus comprising: a circuitry operative to determine respective priorities of a plurality of target receivers to which data is transmitted, and to assign power for transmitting the data at least according to a power loss feature related to a particular target receiver of which the priority is the highest or is higher than a power threshold; and a transmitter operative to transmit, to the plurality of target receivers, the data with the assigned power.

In another general aspect, it is to provide a power control method, at a communication apparatus, comprising: determining respective priorities of a plurality of target receivers to which data is transmitted; assigning power for transmitting the data at least according to a power loss feature related to a particular target receiver of which the priority is the highest or is higher than a power threshold; and transmitting, to the plurality of target receivers, the data with the assigned power.

In another general aspect, it is to provide a communication apparatus comprising: a receiver operative to receive data which is transmitted with a power from a transmitter; and a circuitry operative to decode the received data, wherein the communication apparatus is one of a plurality of target receivers, to which the data is transmitted from the transmitter and respective priorities of which are determined by the transmitter, and the power is assigned at least according to a power loss feature related to a particular target receiver of which the priority is the highest or is higher than a power threshold.

In another general aspect, it is to provide a communication method, comprising: receiving data which is transmitted with a power from a transmitter; decoding the received data, wherein the communication apparatus is one of a plurality of target receivers, to which the data is transmitted from the transmitter and respective priorities of which are determined by the transmitter, and the power is assigned at least according to a power loss feature related to a particular target receiver of which the priority is the highest or is higher than a power threshold.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments will now be described with reference to the drawings, which relate to a communication method, apparatus and system. It is understood that the present technology may be embodied in many different forms and in many different orders and should not be construed as being limited to the embodiments set forth herein. Rather, these embodiments are provided so that this disclosure will be thorough and complete and will fully convey the present technology to those skilled in the art. Indeed, the present technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

While orders of the steps of the methods and the structures of the components are provided herein for exemplary purposes, but not for limitation. The following detailed description of the technology will be presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

Figure 1A:
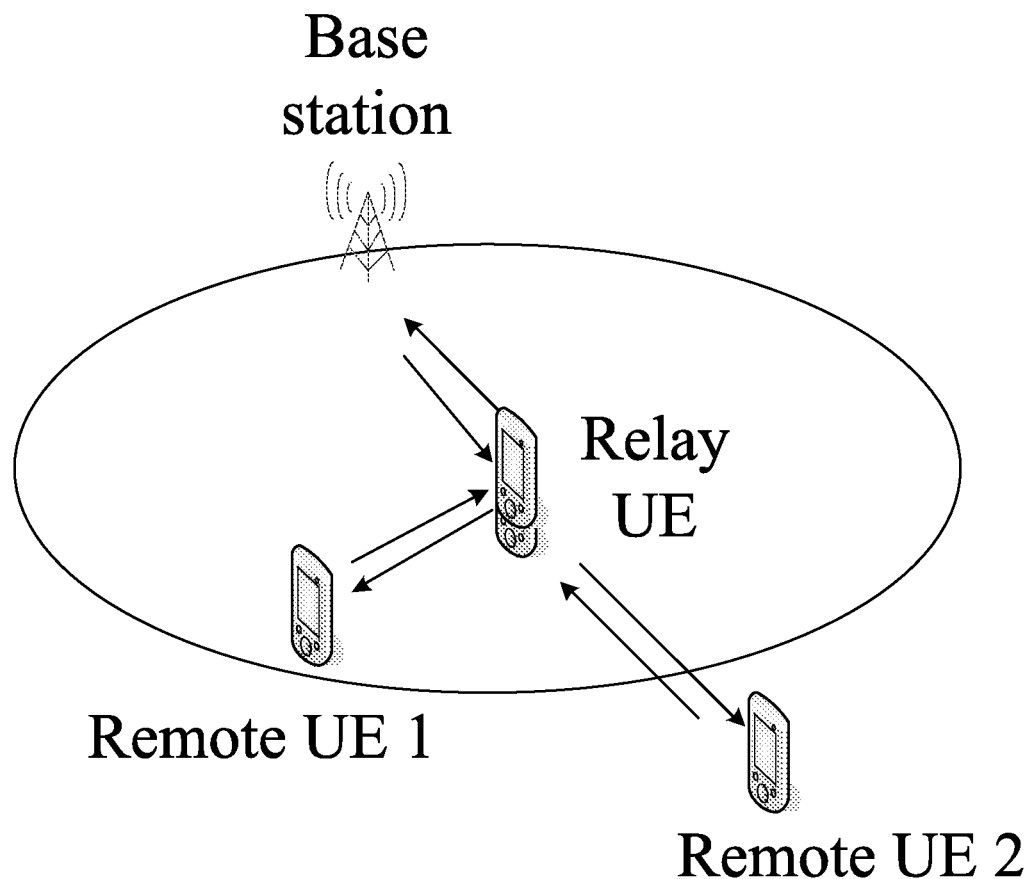
FIGS. 1A-1C schematically show examples of application scenarios applying a power control scheme according to an embodiment of the present disclosure.
Figure 1B:
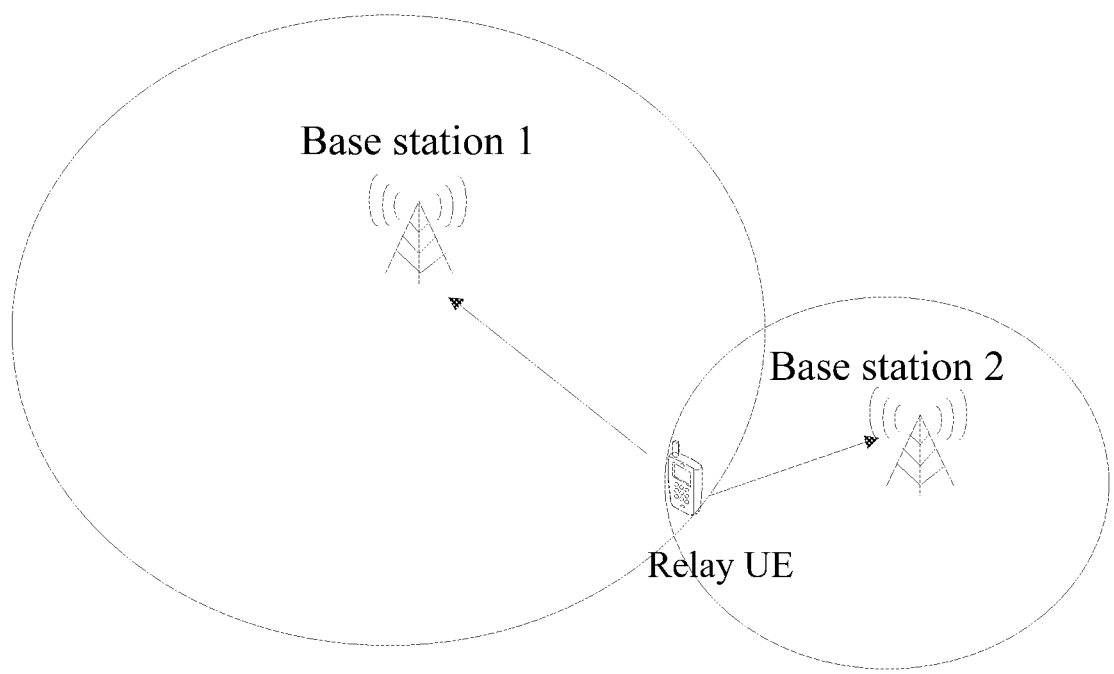
Figure 1C:
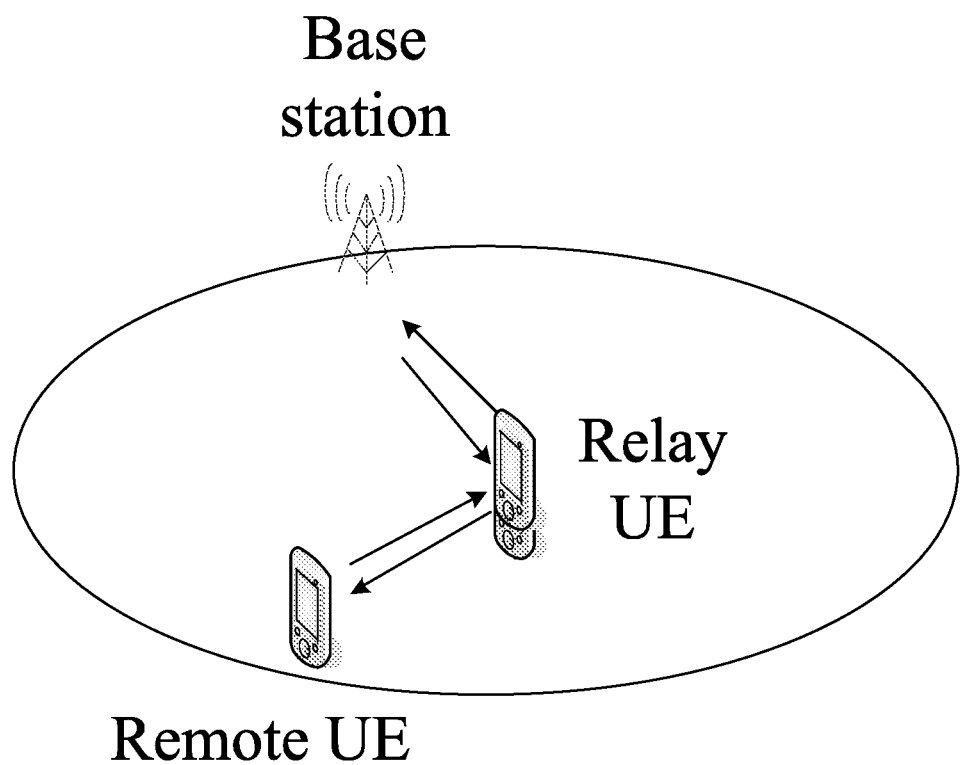

FIGS. 1A-1C schematically show examples of application scenarios applying a power control scheme according to an embodiment of the present disclosure.

As shown in FIG. 1A, the application scenario includes a base station, a relay UE, and multiple remote UEs (e.g., IoT devices), such as a remote UE 1 and a remote UE 2. The relay UE communicates with the base station in a bidirectional mode via uplink and downlink, and communicates with remote UEs in a bidirectional mode via sidelinks by transmitting data to the remote UEs and/or receiving data from the remote UEs. And data allocated with resource blocks can be communicated between the relay UE and the remote UEs. A power control method according to embodiments of the present disclosure may be applied to the application scenario shown in FIG. 1A for assigning power for transmitting data to the base station and/or the remote UEs.

For example, as shown in FIG. 1B, the application scenario includes multiple base stations, such as base station 1 and base station 2, and a relay UE. The relay UE communicates with the multiple base stations in a bidirectional mode via uplink and downlink. And data allocated with the resource blocks can be communicated between the relay UE and the base stations.

As shown in FIG. 1C, the application scenario includes a base station, a relay UE, and a remote UE. The relay UE communicates with the base station in a bidirectional mode via uplink and downlink, and communicates with the remote UE via sidelink. And data allocated with resource blocks can be communicated between the relay UE and the remote UE, and between the relay UE and the base station.

To be noted that the base station may be called as Evolved Node B (eNB), gNB, and other types of base stations in different communication standards.

Thus, the targets to which the data is transmitted may be collectively referred to as target receivers below. So in different scenarios, the target receivers may include multiple remote UEs, multiple base stations, and some of the remote UEs and the multiple base stations. And the data transmitted to the target receivers includes user data transmitted via the physical shared channel (like PSSCH, PDSCH, PUSCH), and/or the control data that is transmitted via the control channel (like PSCCH, PDCCH).

The elements shown in FIGS. 1A, 1B and 1C are exemplary. It should be understood that any other communication apparatus that communicates with the base station and the remote UEs may be applied in the application scenario, and any number of remote UEs and base stations may also be included in the application scenario.

Figure 2A:
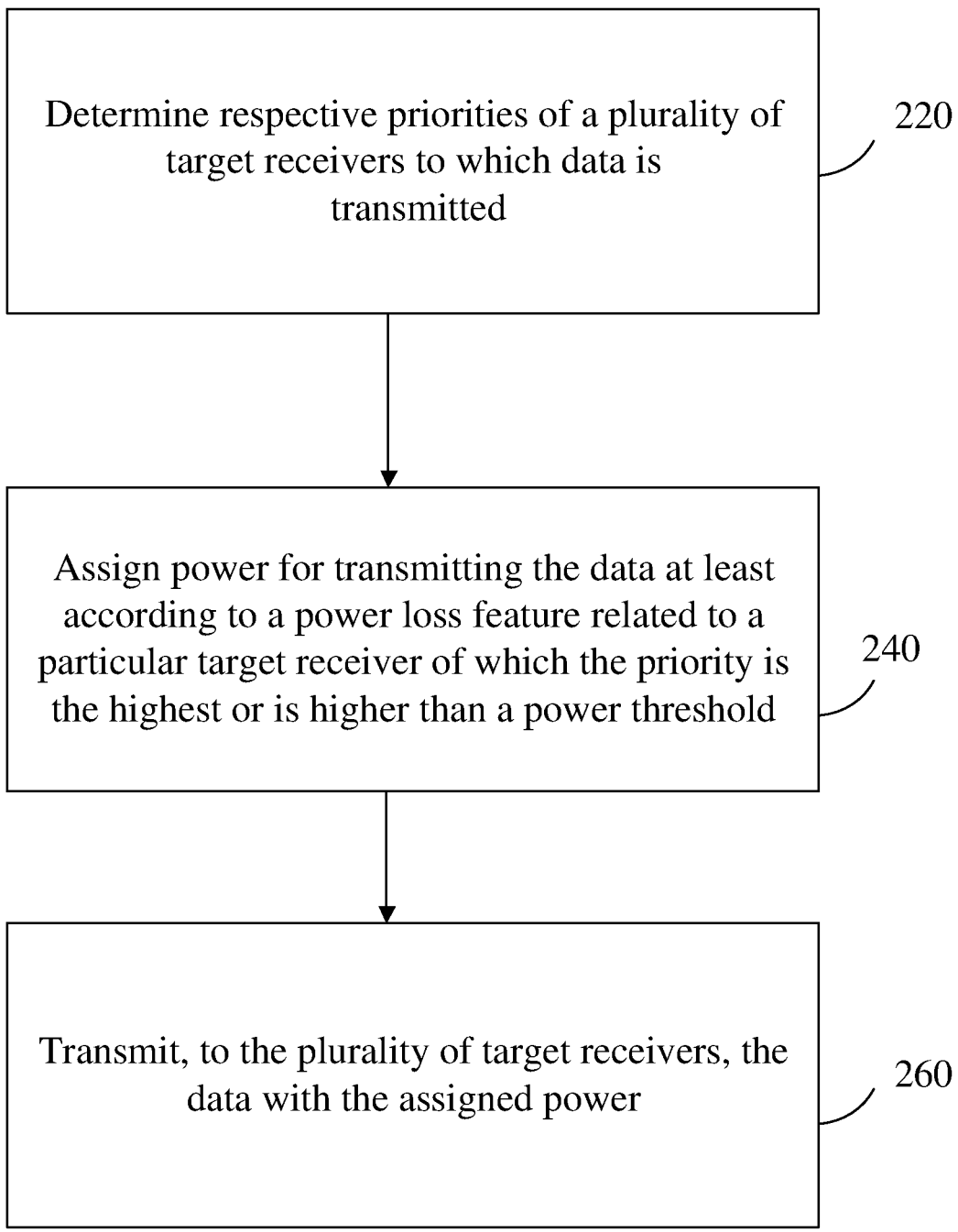
FIG. 2A schematically shows an example of a power control method according to an embodiment of the present disclosure.

FIG. 2A schematically shows an example of a power control method 200, at a communication apparatus, according to an embodiment of the present disclosure. Although specific steps are disclosed in FIG. 2A, such steps are examples. That is, the present disclosure is well suited to performing various other steps or variations of the steps recited in FIG. 2A.

The communication apparatus may be a relay UE, and in an alternative embodiment, the communication apparatus may be a base station.

The communication apparatus may include a circuitry and a transmitter.

In the power control method 200, at step 220, the circuitry of the communication apparatus determines respective priorities of a plurality of target receivers to which data is transmitted.

At step 240, the circuitry of the communication apparatus assigns power for transmitting the data at least according to a power loss feature related to a particular target receiver of which the priority is the highest or is higher than a power threshold.

At step 260, the transmitter of the communication apparatus transmits to the multiple target receivers the data with the assigned power.

Figure 2B:
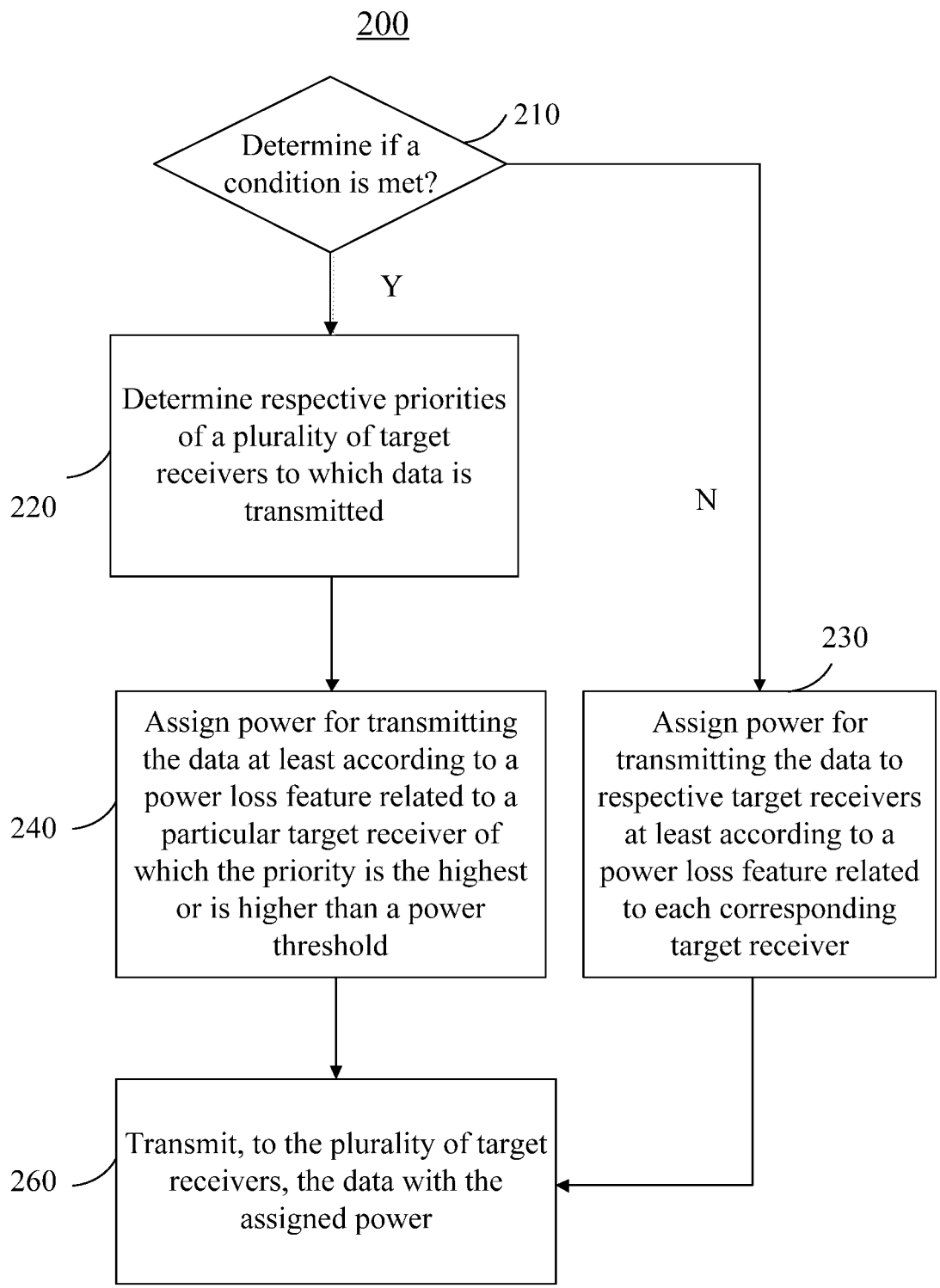
FIG. 2B schematically shows an example of a power control method according to an embodiment of the present disclosure.

In an embodiment, as shown in FIG. 2B schematically showing an example of a power control method according to an embodiment of the present disclosure, before performing the step 220, the power control method 200 includes a step 210 performed by the circuitry of the communication apparatus, for determining if a condition is met. If the condition is not met at step 210, the circuitry of the communication apparatus assigns power for transmitting the data to respective target receivers at least according to a power loss feature related to each corresponding target receiver. If the condition is met as determined at step 210, the step 220 is started in response to that if the condition is met, the step 210 for determining the condition and the step 220 for determining priorities of the target receivers will be illustrated below in combination with FIG. 3A and FIG. 3B.

Figure 3A:
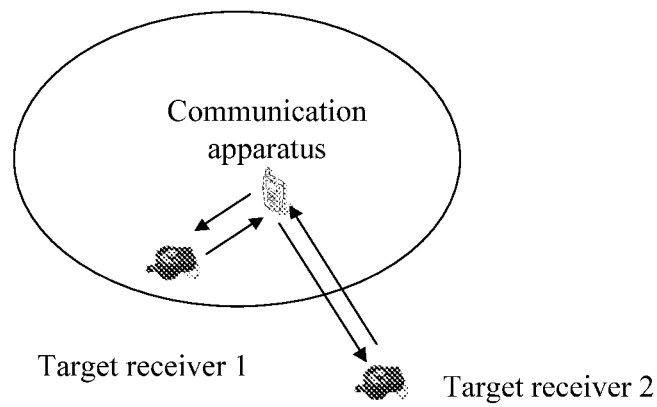
FIG. 3A schematically shows an example of an application scenario applying a power control scheme according to an embodiment of the present disclosure.
Figure 3B:
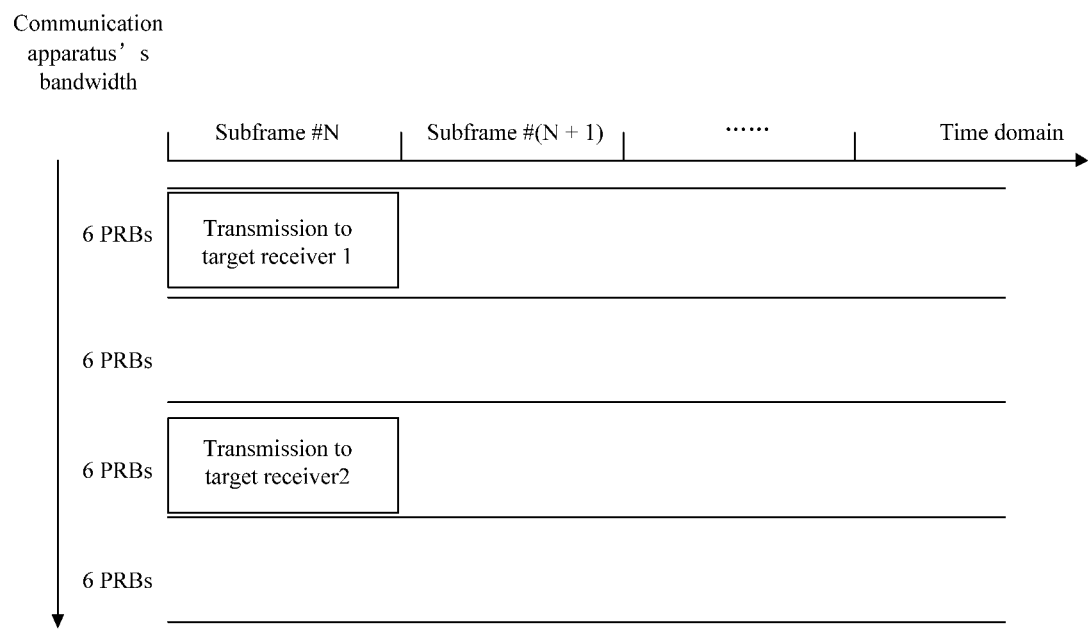
FIG. 3B schematically shows an example of a priority determination scheme for target receivers shown in FIG. 3A to which data is transmitted.

FIG. 3A schematically shows an example of an application scenario applying the power control scheme according to an embodiment of the present disclosure, and FIG. 3B schematically shows an example of a priority determination scheme for target receivers shown in FIG. 3A to which data is transmitted.

As shown in FIG. 3A, a communication apparatus communicates with multiple target receivers, such as target receiver 1 and target receiver 2. For example, the distance from the communication apparatus to the target receiver 2 is longer than the distance from the communication apparatus to the target receiver 1.

As shown in FIG. 3B, the data may be transmitted in a subframe # N (N is an integer) including multiple resource blocks allocated to the respective target receivers. More specifically, in the subframe # N, 6 resource blocks (for example, 6 PRBs as shown in the drawing) over a first bandwidth are allocated to the target receiver 1, and 6 resource blocks over a second bandwidth are allocated to the target receiver 2.

In an embodiment, the condition to be determined in step 210 may include that at least one of the calculated estimated PSD differences is larger than a PSD threshold. And the step 210, by the circuitry, includes estimating power spectral densities (PSDs) for transmitting the data to the target receivers respectively, estimating PSD differences between the estimated PSDs, and determining that the condition is met if at least one of the estimating PSD differences between the estimated PSDs is larger than the PSD threshold.

Before the step 210, the power control method 200 may include a step of allocating resource blocks (such as PRBs) in respective bandwidths and in respective subframe for transmitting the data to the respective target receivers, subframe by subframe.

In an embodiment, the estimated PSD for transmitting data to a target receiver is to ensure a certain received power at the target receiver which receives the data. For example, an estimated PSD (PSD 1) for transmitting data to the target receiver 1 may be calculated, and an estimated PSD (PSD 2) for transmitting data to the target receiver 2 may be calculated, by a following exemplified equation (1).

The equation (1) is as follows, by taking an example in which the communication apparatus is a relay UE, and the target receivers are remote UEs, and the relay UE transmits data to the remote UEs in physical sidelink shared channels (PSSCHs):

$$PSD = \min\{P_{CMAX,PSSCH}, 10\log_{10}(M_{PSSCH\_i}) + P_{O\_PSSCH,i} + \alpha_{PSSCH,1} \cdot PL\_sidelink\_i\}/M_{PSSCH\_i} \quad (1)$$

Here, $P_{CMAX,PSSCH}$ means the maximum power of the PSSCH, $M_{PSSCH\_i}$ is the number of the allocated PRBs for transmitting the data to the corresponding remote UE (i.e., the $i^{th}$ remote UE), PL_sidelink_i is a sidelink pathloss based on a distance between the $i^{th}$ remote UE and relay UE, $P_{O\_PSSCH,i}$ is a targeted Signal to Interference plus Noise Ratio (SINR) at the $i^{th}$ remote UE, and $\alpha_{PSSCH,1}$ is a coefficient of the sidelink pathloss.

As seen from the equation (1), the sidelink pathloss mainly impacts the amount of the estimated PSD if the other parameters like the number of PRBs, $P_{O\_PSSCH,i}$ and $\alpha_{PSSCH,1}$ are similar among remote UEs.

The equation (1) is only an example, and when the target receiver is a base station or other receivers, the equation (1) may be adapted in view of the concept of the equation (1).

Referring back to the step 210, at the step 210, the estimated PSD 1 and PSD 2 are compared to calculate the estimated PSD difference between the target receiver 1 and the target receiver 2 for determining if the condition is met. If the estimated PSD difference between the target receiver 1 and the target receiver 2 is larger than a PSD threshold, the condition is met, and then the step 220 is started, that is, the step 220 is started in response to that the PSD difference between PSD 1 and PSD 2 is larger than the PSD threshold, and the target receiver 2 with the larger PSD is determined to be the particular target receiver with a higher priority. In an embodiment, the PSD threshold may be configured or preconfigured or defined based on power assignment capability of the communication apparatus.

In an embodiment, the step 220 includes determining the priority of a target receiver corresponding to the estimated PSD for the target receiver. In particular, if the estimated PSD for a target receiver is larger, the priority of the target receiver may be higher. If the estimated PSD for a target receiver is lower, the priority of the target receiver may be lower.

It should be understood that, any number of target receivers can be included in the application scenario of FIG. 3A. As such, the communication apparatus estimates PSDs for transmitting the data to each of the target receivers, and calculate estimated PSD differences between the multiple target receivers at step 210 for determining if the condition is met. The step 220 is started in response to that at least one of the calculated estimated PSD differences (including any one of the PSD differences or the largest one of the PSD differences) is larger than the PSD threshold, and the target receiver with the largest PSD is determined to be the particular target receiver with the highest priority.

In an embodiment, as mentioned above, mainly the sidelink pathloss impacts the amount of the estimated PSD if the other parameters like the number of PRBs, $P_{O\_PSSCH,i}$ and $\alpha_{PSSCH,1}$ are similar among the target receivers. Since estimated PSD is mainly associated with the pathloss indicating power consumption on a path between the communication apparatus and a target receiver, and the pathloss is linear with the distance from the communication apparatus to that target receiver, the PSD for the corresponding target receiver may be approximated to be linear with the distance from the communication apparatus to that target receiver. Thus, the condition to be determined at step 210 may include that at least one of distance differences between the communication apparatus and the respective target receivers is larger than a distance threshold.

In an embodiment, the step 220 may be started in response to that at least one of distance differences between the communication apparatus and the respective target receivers (including any one of the distance differences or the largest one of the distance differences) is larger than the distance threshold, and the target receiver with the longest distance from the communication apparatus is determined to be the particular target receiver with the highest priority. In an embodiment, the distance difference threshold may be configured or preconfigured or defined based on power assignment capability of the communication apparatus.

In an embodiment, the step 220 may include determining the priority of the target receiver corresponding to a distance between the communication apparatus and the target receiver. In particular, if the distance between the communication apparatus and the target receiver is longer, the priority of a target receiver may be higher. If the distance between the communication apparatus and the target receiver is shorter, the priority of a target receiver may be lower.

Taking the application scenario shown in FIG. 3A as an example. The distance difference ΔD between the distance from the communication apparatus to the target receivers 1 and the distance from the communication apparatus to the target receivers 2 may be calculated according to an equation (2):

$$\Delta D = 10 \times \log_{10}(D2/D1) \quad (2)$$

In the situation that the distance D1 from the communication apparatus to the target receiver 1 is 10 m, and the distance D2 from the communication apparatus to the target receiver 2 is 100 m, the distance difference ΔD equals to 10 dB according to equation (2). In the case that the distance difference threshold is configured or preconfigured or defined as, for example, 6 dB, the distance difference ΔD is greater than the distance difference threshold. This calculation of the distance difference is only an example, but other calculations of the distance difference (such as, subtracting D1 from D2) are also available.

In this case, the step 220 is started in response to that the difference ΔD is greater than the distance difference threshold $D_{th}$, and at the step 220, the target receiver 2 with the longer distance from the communication apparatus is determined to be the particular target receiver with a higher priority.

In another embodiment, the condition to be determined in step 210 may include that at least one of the calculated estimated PSD differences is larger than the PSD threshold and/or at least one of distance differences between the communication apparatus and the respective target receivers is larger than a distance threshold, the step 220 is performed in response to that determined condition, and in step 220, the priority of the target receiver is determined corresponding to a Quality of Service (QoS) related priority of the data to be transmitted to the target receiver. In particular, if the QoS related priority of the data to be transmitted to a target receiver is higher, the priority of the target receiver may be higher. If the QoS related priority of the data to be transmitted to a target receiver is lower, the priority of the target receiver may be lower. For example, some target receivers require higher QoS of the received data targeted for the some target receivers, so the QoS related priority of the data to be transmitted to the target receivers is higher. As shown in FIG. 3B, if the target receiver 2 requires a higher QoS of the data targeted for the target receiver 2 than the target receiver 1, the target receiver 2 is determined to be the particular receiver with a higher priority.

In an embodiment, the target receiver to which data is transmitted with power higher than a power threshold may be selected as the particular target receiver. If at least one of the calculated estimated PSD differences is larger than the PSD threshold and/or at least one of distance differences between the communication apparatus and the respective target receivers is larger than a distance threshold, the step 220 is performed in response to that determined condition, the target receiver to which data is transmitted with power higher than a power threshold may be selected as the particular target receiver. For example, as shown in FIG. 3B, if the data is transmitted to the target receiver 2 with power higher than the power threshold, and the data is transmitted to the target receiver 1 with power less than the power threshold, then the target receiver 2 to which the data is transmitted with power higher than a power threshold is determined to be the particular receiver with a higher priority.

Once the particular target receiver is determined, in step 240, power is assigned for transmitting the data at least according to a power loss feature related to the particular target receiver of which the priority is the highest or is higher than a power threshold.

In an embodiment, the power P to be assigned may be calculated according to equations (3-1)-(3-3):

$$P_{PSSCH\_\text{remote}} = \min\{P_{CMAX,PSSCH}, 10 \log_{10}(M_{PSSCH}) + P_{O\_PSSCH,1} + \alpha_{PSSCH,1} \cdot PL\_\text{remote}\} \quad (3\text{-}1)$$

$$P_{PSSCH\_eNB} = \min\{P_{CMAX,PSSCH}, 10 \log_{10}(M_{PSSCH}) + P_{O\_PSSCH,1} + \alpha_{PSSCH,1} \cdot PL\_eNB\} \quad (3\text{-}2)$$

$$P_{PSSCH\_\text{final}} = \min\{P_{PSSCH\_\text{remote}}, P_{PSSCH\_eNB}\} \quad (3\text{-}3)$$

wherein in equation (3-1), $P_{PSSCH\_\text{remote}}$ indicates power transmitted from the communication apparatus for transmitting data to the target receiver, $P_{CMAX,PSSCH}$ indicates maximum power of PSSCH for transmitting data from the communication apparatus to the target receiver, $M_{PSSCH}$ is the total number of allocated resource blocks (such as PRBs) for transmitting the data t to the target receivers, PL_remote is pathloss related to the particular target receiver, e.g., PL_remote is calculated according to power loss feature related to the particular target receiver, $P_{O\_PSSCH,1}$ is targeted SINR at the target receiver, and $\alpha_{PSSCH,1}$ is an coefficient of pathloss, wherein equation (3-2) is calculated when base station is involved with the communication with the communication apparatus and/or the target receivers (for example, the communication apparatus may communicate with the base station while transmitting data to the target receivers), $P_{PSSCH\_eNB}$ indicates power transmitted from the base station, and PL_eNB is pathloss related to the base station, e.g., PL_eNB is calculated according to power loss feature related to the base station, e.g., pathloss related to the distance difference between the communication apparatus/target receivers and the base station, the other parameters are similar with those shown in equation (3-1) and will not be illustrated for the purposed of clarity and brevity, and $P_{PSSCH\_\text{final}}$ in equation (3-3) indicates that a final power lower than the power limit calculated by the power loss feature related to the base station (e.g., $P_{PSSCH\_eNB}$) will be assigned for transmitting to the target receives, because the base station is involved in the communication, the final power assigned to the transmission of the resource blocks may be limited by the power reception capability of the base station. To be noted that the final power assigned to the transmission of the resource blocks is a total power for all the data.

Therefore, once the particular target receiver is determined, the total power P to be assigned for transmitting data can be calculated according to equation (3-1) to (3-3). That is, the total power is the lower one of $P_{CMAX,PSSCH}$ which is calculated by a power loss feature related to the base station and a power calculated according to parameters of the total number of allocated PRB number, pathloss related to the distance difference between the communication apparatus and the particular target receiver, and targeted SINR at the target receivers, to guarantee that the total power will not go beyond the power reception capability of the base station, because the total power will be lower than or equal to $P_{CMAX,PSSCH}$ which is calculated by a power loss feature related to the base station.

In an embodiment, the power loss feature related to the particular target receiver includes pathloss (for example, PL_remote in the above equation) indicating power consumption on a path between the communication apparatus and the particular target receiver, and the power loss feature related to the base station includes pathloss (for example, PL_eNB in the above equation) indicating power consumption on a path between the base station and the communication apparatus.

Once the total power has been determined, the total power is assigned for transmitting the data to the target receivers. In step 240, the circuitry assigns power for transmitting the data to the target receiver. In an embodiment, the total power is assigned for transmitting data in a subframe including resource blocks to the target receivers. And for each individual power for transmitting data in each resource block, for example, the total power P may be further divided by the number of the total number of the allocated resource blocks (PRBs) in a subframe to obtain the individual power for each resource block indicating PSD for the target receivers, and since the individual power assigned for each resource block is kept even, the PSD difference among the target receivers may be eliminated, which improves the power control implementation of the communicate apparatus efficiently while ensuring certain received powers at the target receivers.

In an embodiment, the power control method 200 according to an embodiment of the present disclosure includes a step (not shown in FIG. 2A or FIG. 2B) of allocating resource blocks to the data for target receivers subframe by subframe, by the circuitry as mentioned above. As a result, due to the allocation scheme, the target receives that are to receive the data with allocated resource blocks may vary dynamically subframe by subframe. As the power control method 200 according to an embodiment of the present disclosure determines respective priorities of the target receivers to which data is transmitted, the circuitry performs the step 220 subframe by subframe, which can efficiently and flexibly perform power control for transmitting the data, subframe by subframe.

Then, at step 260, the transmitter of the communication apparatus transmits to the multiple target receivers the data with the assigned power, respectively.

Figure 4:
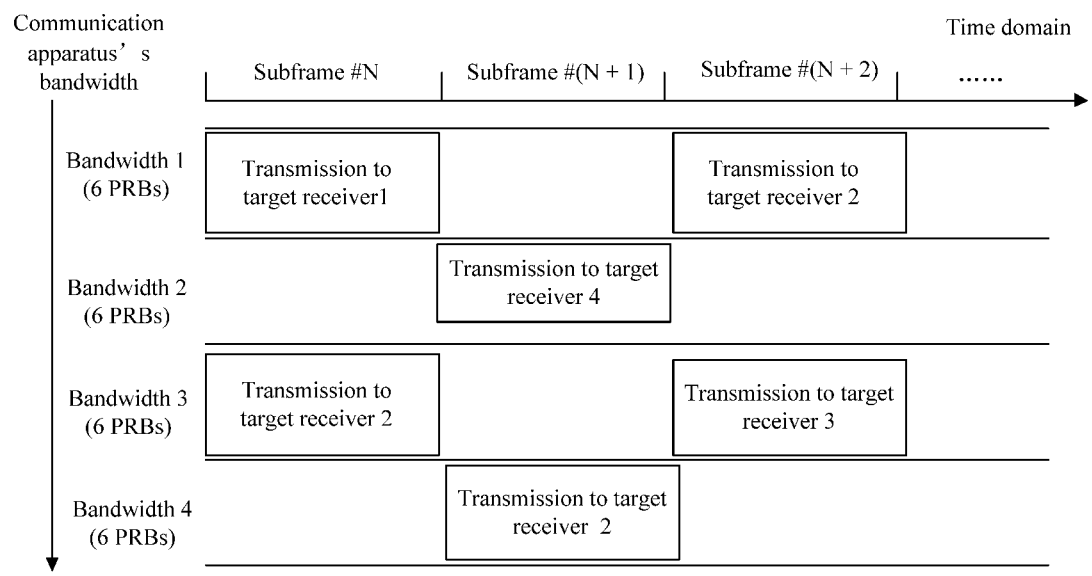
FIG. 4 schematically shows an example of a priority determination scheme and a power assignment scheme for target receivers to which data are transmitted in multiple subframes.

FIG. 4 schematically shows an example of a priority determination scheme and a power assignment scheme for target receivers to which data is transmitted, based on the PSD, the distance and the QoS related priority, respectively.

In one embodiment, the priority determination scheme is based on the PSD.

Assuming a communication apparatus communicates with four target receivers including target receiver 1, target receiver 2, target receiver 3, and target receiver 4. And the distance d1 between the target receiver 1 and the communication apparatus is 100 m, the distance d2 between the target receiver 2 and the communication apparatus is 10 m, the distance d3 between the target receiver 3 and the communication apparatus is 20 m, and the distance d4 between the target receiver 4 and the communication apparatus is 80 m. It should be understood that the arrangement of the target receivers shown in FIG. 4 is only for illustrative purpose and other arrangement of the target receivers are available herein.

In the case that condition to be determined at step 210 includes at least one of the calculated estimated PSD differences is larger than the PSD threshold, estimated PSD differences are calculated for determining if the condition is met subframe by subframe, and the step 220 is started in response to that at least one of the calculated estimated PSD differences is larger than the PSD threshold. At the step 220, the priority of a target receiver is determined corresponding to the estimated PSD for the target receiver and the target receiver with the largest PSD is determined to be the particular target receiver with the highest priority. FIG. 4 shows an example of the priority determination scheme subframe by subframe according to the estimated PSD differences.

As shown in FIG. 4, in a Transmission Time Interval (TTI) for transmitting subframe # N, i.e., in subframe # N, 6 resource blocks over bandwidth 1 are allocated to the target receiver 1, and 6 resource blocks over bandwidth 3 are allocated to the target receiver 2. As the distance d1 between the target receiver 1 and the communication apparatus is much greater than the distance d2 between the target receiver 2 and the communication apparatus, thus, pathloss between the target receiver 1 and the communication apparatus is much greater than the pathloss between the target receiver 2 and the communication apparatus (e.g., according to equation (1)), and therefore, the PSD difference between the PSDs for the target receiver 1 and target receiver 2 may be greater that the PSD threshold, then the priorities of the target receivers 1 and 2 are determined, and in an embodiment, the target receiver 1 with the larger PSD is determined to be the particular target receiver that has a higher priority. Therefore, the total power assigned for transmitting the data is calculated according to power loss feature related to the particular target receiver 1 according to equations (3-1)-(3-3), and the total power is lower than $P_{CMAX,PSSCH}$ which is calculated by a power loss feature related to the base station if the base station is involved.

In the subframe #(N+1), 6 resource blocks over bandwidth 2 are allocated to the target receiver 4, and 6 resource blocks over bandwidth 4 are allocated to the target receiver 2. As the distance d4 between the target receiver 4 and the communication apparatus is much greater than the distance d2 between the target receiver 2 and the communication apparatus, thus, pathloss between the target receiver 4 and the communication apparatus is much greater than the pathloss between the target receiver 2 and the communication apparatus (e.g., according to equation (1)), therefore, the PSD difference between the PSDs for the target receiver 4 and target receiver 2 may be greater that the PSD threshold, then the priorities of the target receivers 2 and 4 are determined, and in an embodiment, the target receiver 4 with the larger PSD is determined to be the particular target receiver that has a higher priority. Therefore, the total power assigning for transmitting the data in the subframe #(N+1) is calculated according to power loss feature related to the particular target receiver 4 according to equation (3-1)-(3-3), and the total power is lower than $P_{CMAX,PSSCH}$ which is calculated by a power loss feature related to the base station.

For the subframe #(N+2), 6 resource blocks over bandwidth 1 are allocated to the target receiver 2, and 6 resource blocks over bandwidth 3 are allocated to the target receiver 3. As the distance d2 between the target receiver 2 and the communication apparatus is close to the distance d3 between the target receiver 3 and the communication apparatus, thus, pathloss between the target receiver 2 and the communication apparatus is close to the pathloss between the target receiver 3 and the communication apparatus (e.g., according to equation (1)), therefore, the PSD difference between the PSDs for the target receiver 3 and target receiver 2 may be not greater that the PSD threshold, then the step of 220 will not be performed, while step 230 as shown in FIG. 2B is performed accordingly, and the power assigned for transmitting the data that are to be transmitted to the target receiver 2 and the target receiver 3 may be calculated respectively according to power loss feature related to the target receiver 2 and the target receiver 3 according to equations (3-1)-(3-3), wherein for each target receiver, the power is calculated according to parameters of the allocated PRB number for that target receiver, pathloss related to the distance difference between the communication apparatus and that target receiver, and targeted SINR at target receiver.

In the subframes next to the subframe #(N+2), similar priority determination scheme and power assignment scheme are performed subframe by subframe, and details will not be described for the purpose of brevity.

In one embodiment, the priority determination scheme is based on the distance.

In particular, in the case that condition to be determined at step 210 includes that at least one of distance differences between the communication apparatus and the respective target receivers is larger than the distance threshold, the step 220 is started in response to that at least one of distance differences between the communication apparatus and the respective target receivers is larger than the distance threshold subframe by subframe, and the priority of a target receiver is determined corresponding to a distance between the communication apparatus and the target receiver, and the target receiver with the longest distance from the communication apparatus is determined to be the particular target receiver with the highest priority. FIG. 4 shows an example of the priority determination scheme and power assignment scheme, subframe by subframe, according to the distance between the communication apparatus and the target receivers.

As shown in FIG. 4, in a transmission time interval (TTI) for transmitting data in the subframe # N, multiple resource blocks, such as 6 resource blocks (such as 6 PRBs) over bandwidth 1 are allocated to the target receiver 1, and 6 resource blocks (such as 6 PRBs) over bandwidth 3 are allocated to the target receiver 2. The distance difference $\Delta D_N$ between the communication apparatus and the target receivers 1 and 2 is calculated according to an equation (2) and equals to 10 dB, accordingly. It is provided that the distance threshold is 6 dB, and the distance difference $\Delta D_N$ between the communication apparatus and the target receivers 1 and 2 is greater than the distance threshold, then the priorities of the target receivers 1 and 2 are determined, and in an embodiment, the target receiver 1 with the longer distance from the communication apparatus is determined to be the particular target receiver with a higher priority. Therefore, the total power assigning for transmitting the data in the subframe # N is calculated according to power loss feature related to the particular target receiver 1 according to equations (3-1)-(3-3), and the total power is lower than $P_{CMAX,PSSCH}$ which is calculated by a power loss feature related to the base station.

In the subframe #(N+1), 6 resource blocks over bandwidth 2 are allocated to the target receiver 4, and 6 resource blocks over bandwidth 4 are allocated to the target receiver 2. The distance difference $\Delta D_{(N+1)}$ between the communication apparatus and the target receivers 2 and 4 is calculated according to an equation (2) and equals to 9 dB, accordingly, which is greater than the distance threshold, and meets the condition for starting to determine the priority of the target receivers. Then the priorities of the target receivers 2 and 4 are determined, and in an embodiment, the target receiver 4 with the longer distance from the communication apparatus is determined to be the particular target receiver with a higher priority. In this case, compared to the determination of priority based on PSD, such determination of priority based on the distance may reduce the calculation cost and time for calculating PSD based on the pathloss caused by the distance. Therefore, the total power assigning for transmitting the data in the subframe #(N+1) is calculated according to power loss feature related to the particular target receiver 4 according to equations (3-1)-(3-3), and the total power is lower than $P_{CMAX,PSSCH}$ which is calculated by a power loss feature related to the base station if the base station is involved.

In the subframe #(N+2), 6 resource blocks over bandwidth 1 are allocated to the target receiver 2, and 6 resource blocks over bandwidth 3 are allocated to the target receiver 3. The distance difference $\Delta D_{(N+2)}$ between the communication apparatus and the target receivers 2 and 3 is calculated according to an equation (2) and approximates to 3 dB, which is less than the distance threshold (e.g., 6 dB), the step 220 will not be performed, while step 230 as shown in FIG. 2B is performed accordingly, and then the power for transmitting the data to the target receiver 2 and the target receiver 3 may be calculated respectively according to power loss feature related to the target receiver 2 and the target receiver 3 according to equations (3-1) and (3-2), wherein for each target receiver, the power is calculated according to parameters of the allocated PRB number for that target receiver, pathloss related to the distance difference between the communication apparatus and that target receiver, and targeted SINR at that target receiver.

In the subframes next to the subframe #(N+2), similar determination scheme are performed subframe by subframe, and details will not be described for the purpose of brevity.

In one embodiment, the priority determination scheme is based on the QoS related priority.

In particular, in another embodiment, in that case that the priority of a target receiver is determined corresponding to a QoS related priority of the data transmitted to the target receiver, the target receiver with the data of the highest priority to be received is determined to be the particular receiver with the highest priority.

Before the priority determination step is performed, the power control method 200 according to an embodiment of the present disclosure determines the condition at step 210 subframe by subframe. In an embodiment, the condition to be determined includes that at least one of the calculated estimated PSD differences is larger than the PSD threshold and/or at least one of distance differences between the communication apparatus and the respective target receivers is larger than a distance threshold, the step 220 is performed in response to that determined condition, the priority of the respective target receivers are determined, and each priority of the target receiver is determined corresponding to a QoS related priority of the data transmitted to the target receiver. The target receiver with the data of the highest priority to be received is determined to be the particular receiver with the highest priority in an embodiment. FIG. 4 shows an example of the priority determination scheme subframe by subframe according to QoS related priority of the data to be transmitted to the target receiver.

In an embodiment, the QoS related priority of the data transmitted to the target receiver 1 is PR1, the QoS related priority of the data transmitted to the target receiver 2 is PR2, the QoS related priority of the data transmitted to the target receiver 3 is PR3, and the QoS related priority of the data transmitted to the target receiver 4 is PR4, and it is provided that the priority of PR1>the priority of PR2>the priority of PR3>the priority of PR4. It should be understood that the arrangement of the target receivers shown in FIG. 4 is only for illustrative purpose and other arrangement of the target receivers are available herein.

As shown in FIG. 4, in a TTI for transmitting subframe # N, e.g., in subframe # N, multiple resource blocks, such as 6 resource blocks over bandwidth 1 are allocated to the target receiver 1, and 6 resource blocks over bandwidth 3 are allocated to the target receiver 2. In the case that the estimated PSD difference between the target receiver 1 and target receiver 2 is greater that the PSD threshold and/or the distance difference $\Delta D_N$ between the communication apparatus and the target receivers 1 and 2 is greater than the distance threshold, then the Qos related priorities of the target receivers 1 and 2 are started to be determined, the target receiver 1 with higher QoS related priority of data to be received is determined to be the particular target receiver with a higher priority. Therefore, the total power assigning for transmitting the data in the subframe # N is calculated according to power loss feature related to the particular target receiver 1 according to equations (3-1)-(3-3), and the total power is lower than $P_{CMAX,PSSCH}$ which is calculated by a power loss feature related to the base station if the base station is involved.

In the subframe #(N+1), 6 resource blocks over bandwidth 2 are allocated to the target receiver 4, and 6 resource blocks over bandwidth 4 are allocated to the target receiver 2. In the case that the estimated PSD difference between the target receiver 2 and target receiver 4 is greater that the PSD threshold and/or the distance difference $\Delta D_{(N+1)}$ between the communication apparatus and the target receivers 2 and 4 is greater than the distance threshold, then the QoS related priorities of the target receivers 2 and 4 are started to be determined at step 220, the target receiver 2 with higher QoS related priority of data to be received is determined to be the particular target receiver with a higher priority. Therefore, the total power assigning for transmitting the data in the subframe #(N+1) is calculated according to power loss feature related to the particular target receiver 2 according to equations (3-1)-(3-3), and the total power is lower than $P_{CMAX,PSSCH}$ which is calculated by a power loss feature related to the base station if the base station is involved.

For the subframe #(N+2), 6 resource blocks over bandwidth 1 are allocated to the target receiver 2, and 6 resource blocks over bandwidth 3 are allocated to the target receiver 3. In the case that the estimated PSD difference between the target receiver 2 and target receiver 3 is not greater that the PSD threshold and/or the distance difference $\Delta D_{(N+2)}$ between the communication apparatus and the target receivers 2 and 3 is not greater than the distance threshold, the step 220 will not be performed, while step 230 as shown in FIG. 2B is performed accordingly, and then the power for transmitting the data to the target receiver 2 and the target receiver 3 may be calculated respectively according to power loss feature related to the target receiver 2 and the target receiver 3 according to equations (3-1)-(3-3), wherein for each target receiver, the power is calculated according to parameters of the allocated PRB number for that target receiver, pathloss related to the distance difference between the communication apparatus and that target receiver, and targeted SINR at that target receiver.

In the subframes next to the subframe #(N+2), similar priority determination scheme and power assignment scheme are performed subframe by subframe, and details will not be described for the purpose of brevity.

Figure 5A:
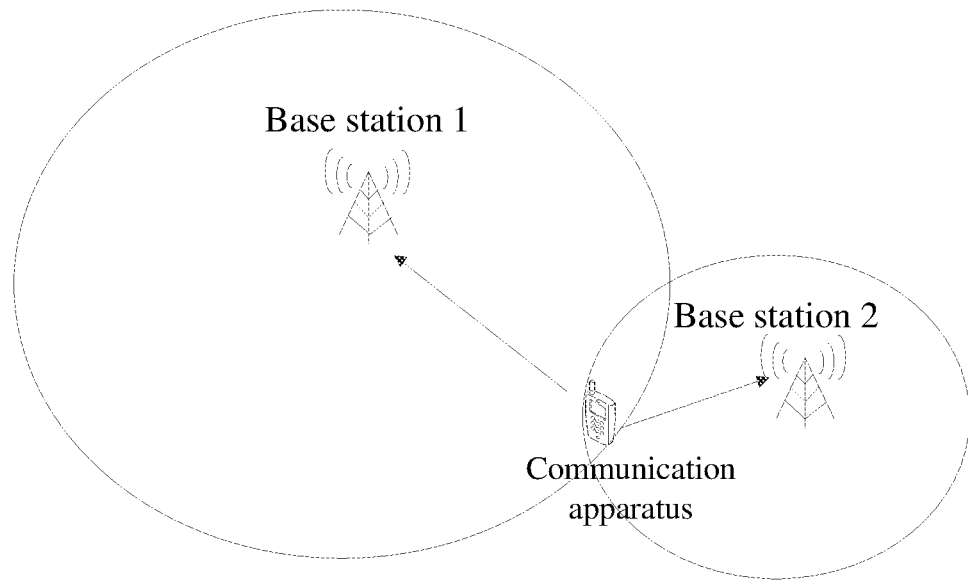
FIG. 5A schematically shows an example of an application scenario applying a power control scheme according to another embodiment of the present disclosure.

As mentioned above, in an embodiment, the communication apparatus is relay user equipment (UE), and the target receivers includes base stations. FIG. 5A schematically shows an example of such application scenario applying a power control scheme according to another embodiment of the present disclosure. The application scenario includes a UE as the communication apparatus, and multiple base stations (for example, base station 1 and base station 2 as the target receivers.

In an embodiment, the communication apparatus determines respective priorities of the base station 1 and base station 2 to which the data is transmitted in the subframe # M, and power is assigned for transmitting the data at least according to a power loss feature related to a particular base station of which the priority is the highest or is higher than a power threshold.

In an embodiment, the communication apparatus performs steps 220 and 240 as shown in FIG. 2A. In an embodiment, the communication apparatus implements the step 210 shown in FIG. 2B for determining a condition, and the step 220 is started in response to that the condition is determined. Then the communication apparatus determines respective priorities of the base station 1 and base station 2 in response to that condition. And the step 210 for determining the condition and priorities of the base stations will be illustrated below in combination with FIG. 5A and FIG. 5B.

Figure 5B:
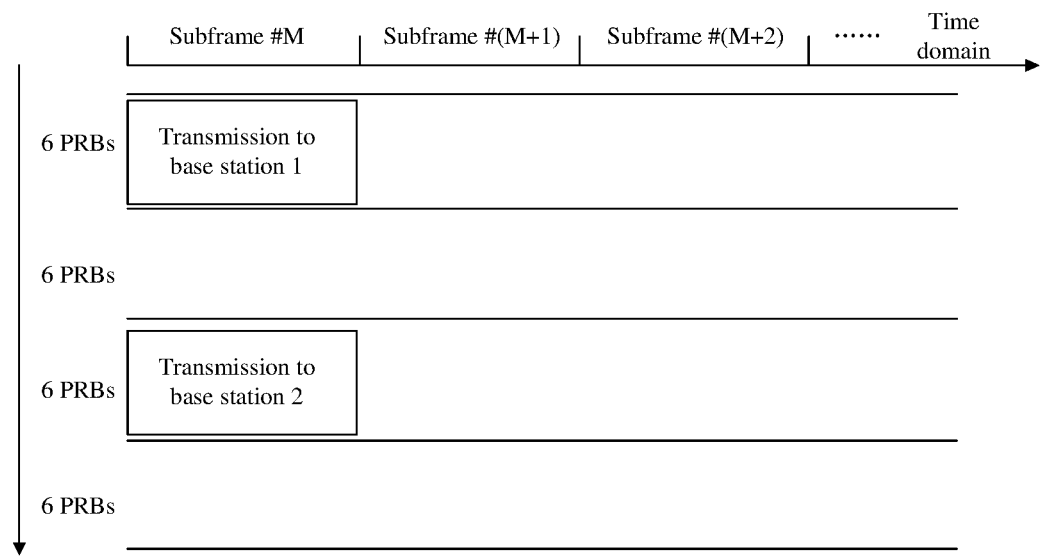
FIG. 5B schematically shows an example of a priority determination scheme for base stations shown in FIG. 5A to which data is transmitted.

FIG. 5B schematically shows an example of a priority determination scheme for base stations shown in FIG. 5A to which data is transmitted in a subframe. As shown in FIG. 5B, in subframe # M (M is an integer), multiple such as 6 resource blocks over a first bandwidth are allocated to the base station 1, and 6 resource blocks over a second bandwidth are allocated to the base station 2.

In an embodiment, the condition to be determined includes that the calculated estimated PSD differences is larger than the PSD threshold, and the priority of the base station is determined corresponding to the estimated PSD for the base station.

In an embodiment, estimated PSD for transmitting the data to each base station indicates power assignment per resource block. That is, the estimated PSD (PSD b1) for transmitting data to the base station 1 can be calculated by dividing power assigned for transmitting the data to the base station 1 by the number of the allocated resource blocks to the base station 1, and the estimated PSD (PSD b2) for transmitting data to the base station 2 can be calculated by dividing power assigned for transmitting the data to the base station 2 by the number of the resource blocks allocated to the base station 2.

PSD b1 and PSD b2 are compared to calculate estimated PSD difference between PSD b1 and PSD b2 for the base station 1 and the base station 2, respectively. The communication apparatus starts to determine respective priorities of the base station 1 and base station 2 in response to that the PSD difference between PSD b1 and PSD b2 is larger than a PSD threshold, and the base station with the larger PSD is determined to be the particular target receiver with a higher priority. In an embodiment, the PSD threshold is configured or preconfigured or defined based on power assignment capability of the communication apparatus.

It should be understood that, any number of base stations can be included in the application scenario of FIG. 5A. As such, the communication apparatus calculates estimated PSDs for transmitting the data to each of the base stations, and calculate estimated PSD differences between the PSDs for the multiple base stations. The communication apparatus starts to determine respective priorities of the base stations in response to that at least one of the calculated estimated PSD differences is larger than the PSD threshold, and the base station with the largest PSD is determined to be the particular base station with the highest priority.

In an embodiment, the condition to be determined includes that at least one of distance differences between the communication apparatus and the respective base stations is larger than a distance threshold, and the priorities of the base stations may be determined corresponding to a distance between the communication apparatus and the target receivers. In an embodiment, the communication apparatus starts to determine respective priorities of the base stations in response to that the distances between the communication apparatus and the respective base stations is larger than the distance threshold, and the base station with the longest distance from the communication apparatus is determined to be the particular base station with the highest priority. In an embodiment, the distance difference threshold is configured or preconfigured or defined based on power assignment capability of the communication apparatus.

Taking the application scenario shown in FIG. 5A as an example. The distance difference ΔDb between the communication apparatus and the base stations 1 and 2 may be calculated according to an equation (2).

In the condition that the distance difference threshold is configured or preconfigured or defined as, for example, if the distance difference ΔDb is greater than the distance difference threshold, the communication apparatus starts to determine respective priorities of the base stations in response to that the difference ΔDb is greater than the distance difference threshold, and the base station with the longer distance from the communication apparatus is determined to be the particular target receiver with a higher priority.

In another embodiment, the condition includes that at least one of the calculated estimated PSD differences is larger than the PSD threshold and/or at least one of distance differences between the communication apparatus and the respective base stations is larger than a distance threshold, and the communication apparatus starts to determine respective priorities of the base stations in response to the determined condition, and the priority of the base stations is determined corresponding to a QoS related priority of the data transmitted to the base station. In an embodiment, if the data transmitted to a base station have the highest priority than those to be transmitted to the other base stations, the base station with the data of the highest priority to be received is determined to be the base station with the highest priority. As shown in FIG. 5B, the data transmitted to the base station with a higher priority than those transmitted to the other base station is determined to be the particular base station with a higher priority.

In an embodiment, the base station to which data is transmitted with power higher than a power threshold may be selected as the particular target receiver. If at least one of the calculated estimated PSD differences is larger than the PSD threshold and/or at least one of distance differences between the communication apparatus and the respective target receivers is larger than a distance threshold (e.g., is not necessarily the largest one), the communication apparatus determines priorities of the base stations according to the power assigned for transmitting the data. For example, as shown in FIG. 5B, if at least one of the calculated estimated PSD differences is larger than the PSD threshold and/or at least one of distance differences between the communication apparatus and the respective target receivers is larger than a distance threshold, the data is transmitted to the base station 2 with power higher than the power threshold, the data is transmitted to the base station 1 with power less than the power threshold, and the base station 2 to which the data is transmitted with power higher than a power threshold is determined to be the particular base station with a higher priority.

Once the particular base station is determined, power is assigned for transmitting the data at least according to a power loss feature related to the particular base station. In an embodiment, the total power that is to be assigned to the base stations may be calculated in accordance with equations (3-2) or (3-3), as in the application scenario shown in FIG. 5, the parameters PL_remote and PL_eNB is the same, which indicates the pathloss on the path between the base station and the communication apparatus. The total power may be assigned for transmitting the data in a similar way as described above, which will not be illustrated for the purpose of brevity and clarity.

In an embodiment, the communication apparatus may be a relay user equipment (UE), and the target receivers includes a combination of at least one remote UE and at least one base station, and the power control scheme that can be applied is similar as described above, which will not illustrated for the purpose of brevity and clarity. In that case, the total power assigned for transmitting the data transmitted to the target receivers may be determined according to equations (3-1)-(3-3), and the power is lower than a power limit calculated by a power loss feature related to the base station.

In another embodiment, the communication apparatus may be a base station for assigning power for a communication apparatus (e.g., a relay UE) to transmit data to the target receivers, and the target receivers include at least one remote UE and at least one base station. In that case, the power control scheme that can be applied is similar as described above, which will not be illustrated for the purpose of brevity and clarity. And the total power that assigned for transmitting the data may be determined according to equations (3-1)-(3-3), and the power is lower than a power limit calculated by a power loss feature related to the base station.

Figure 6:
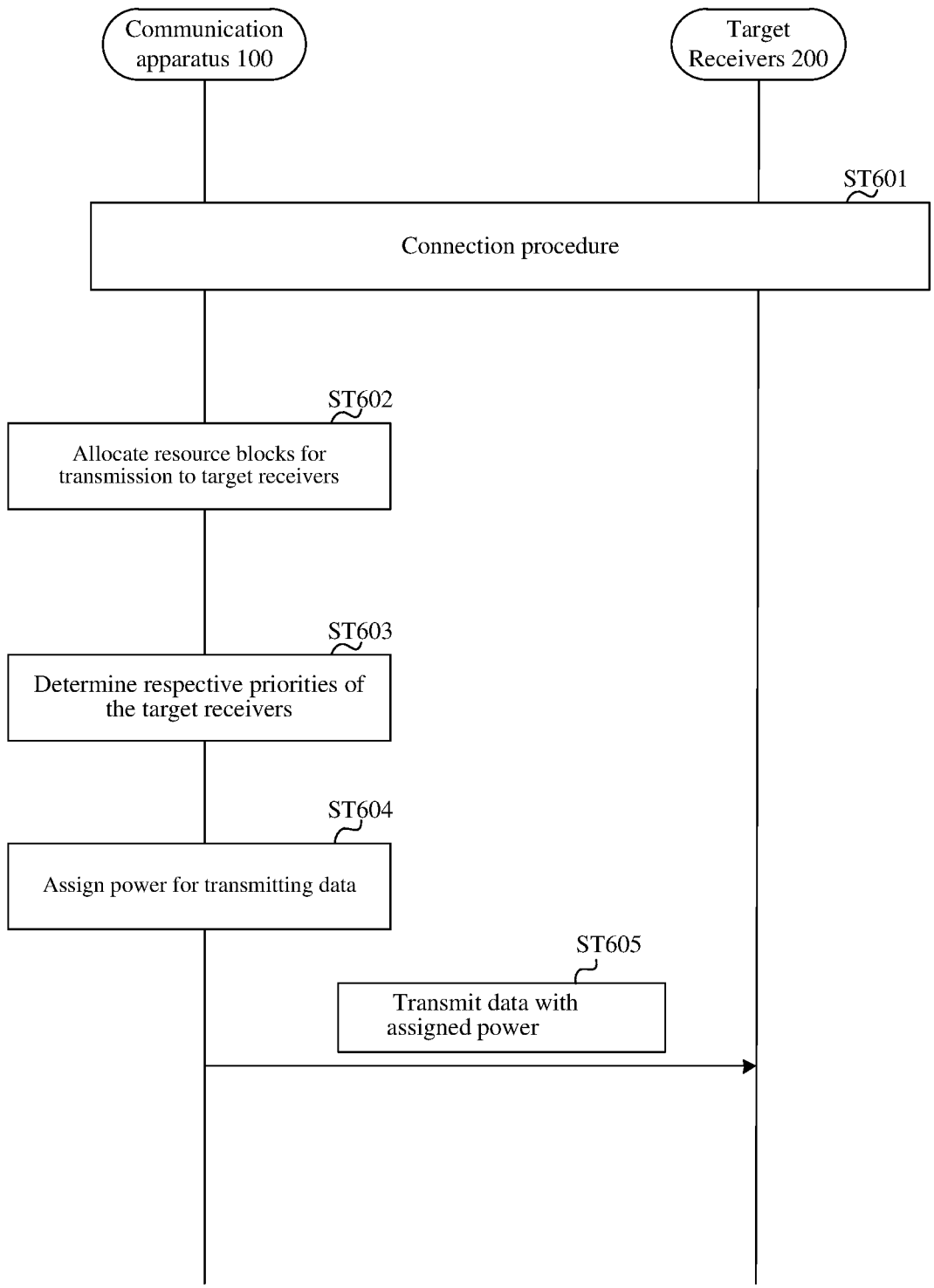
FIG. 6 schematically shows an example of a flowchart of communication between a communication apparatus and a target receiver when a base station is not involved according to an embodiment of the present disclosure.

FIG. 6 schematically shows an example of a flowchart of communication between a communication apparatus and a target receiver when a base station is not involved according to an embodiment of the present disclosure. In an embodiment, the communication apparatus includes a relay UE, and the target receives include multiple remote UEs. Although specific steps are disclosed in FIG. 6, such steps are examples. That is, the present disclosure is well suited to performing various other steps or variations of the steps recited in FIG. 6.

As shown in FIG. 6, a communication apparatus 100 communicates with multiple target receivers to which data is transmitted. At step ST601, the communication apparatus 100 connects with the target receives in a connection procedure. The connection may be established by implementing known or future developed method whose details are omitted herein.

At step ST602, the communication apparatus 100 allocates resource blocks for transmission to the target receivers. This step may be similar to that as described above, and detail thereof is not repeated.

At step ST603, the communication apparatus 100 determines respective priories of the target receivers. This step may be similar to that described in step 220, and in combination with step 210 with references to FIG. 2A-FIG. 3B. The details thereof are omitted for the purpose of clarity and brevity.

At step ST604, the communication apparatus 100 assigns power for transmitting data to the target receivers. The total power to be assigned may be calculated according to equation (3-1), and the communication apparatus 100 assigns power for transmitting the data in a similar way as described above, and the details thereof are omitted for the purpose of clarity and brevity.

At step ST605, the communication apparatus 100 transmits data with assigned power to the target receivers. As the power assigned for each allocated resource block are kept even, the PSD difference for each target receiver may be eliminated thereof, which improves the power control implementation of the communicate apparatus efficiently while ensuring certain received powers at the target receivers.

In an embodiment, a base station including eNB and/or gNB may be included to communication with the communication apparatus 100 and the target receivers 200. In that case, the communication apparatus 100 includes a relay UE, and the target receivers 200 include multiple remote UE.

Figure 7:
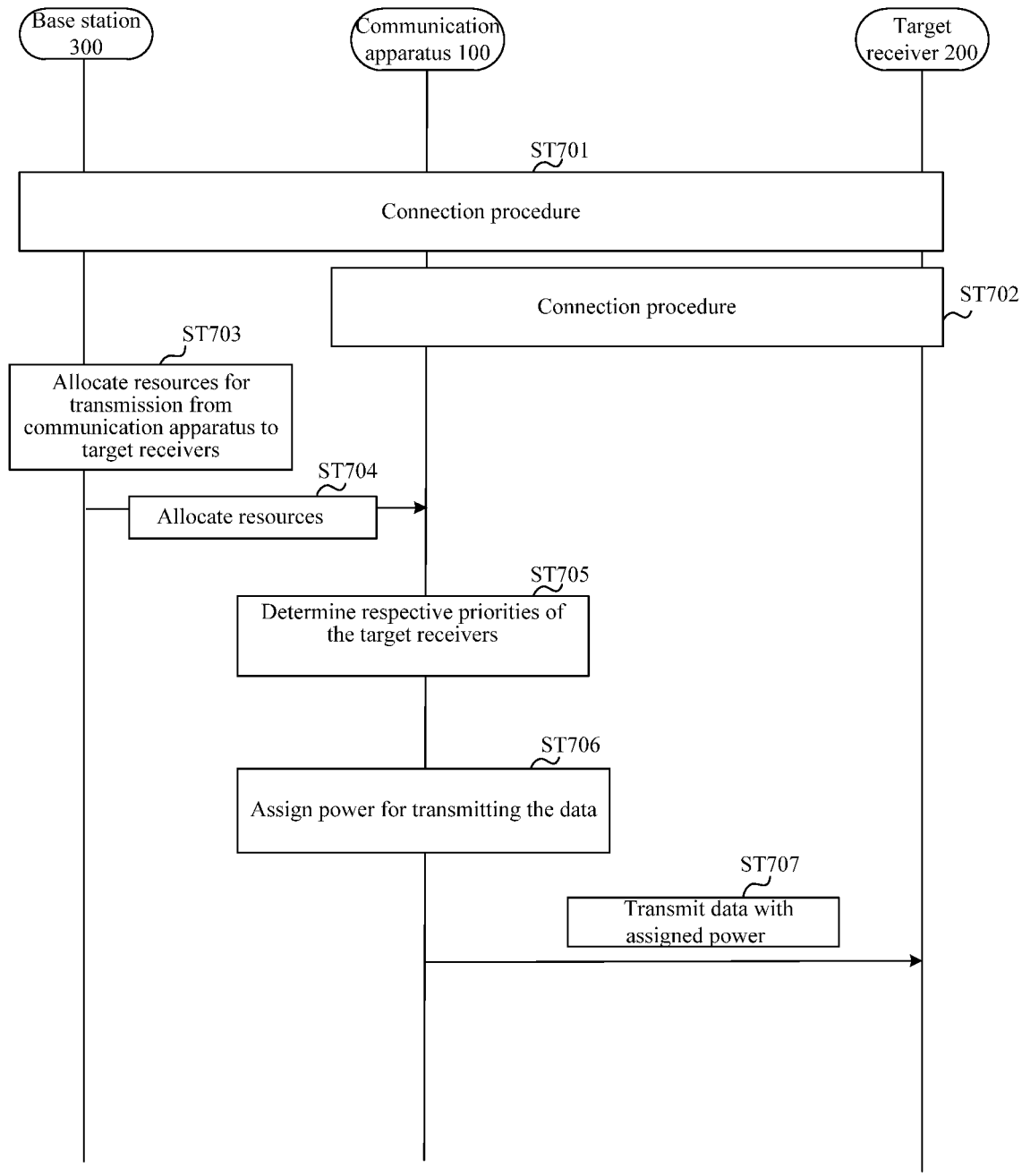
FIG. 7 schematically shows an example of a flowchart of communication between a communication apparatus and a target receiver when a base station is involved according to an embodiment of the present disclosure.

FIG. 7 schematically shows an example of a flowchart of communication between a communication apparatus and a target receiver when a base station is involved according to an embodiment of the present disclosure. In an embodiment, the communication apparatus 100 includes a relay UE, and the target receives include multiple remote UEs. Although specific steps are disclosed in FIG. 7, such steps are examples. That is, the present disclosure is well suited to performing various other steps or variations of the steps recited in FIG. 7.

As shown in FIG. 7, a communication apparatus 100 communicates with multiple target receivers to which data is transmitted. And a base station 300 communications with the communication apparatus 100 and the target receivers 200.

At step ST701, the base station 300 connects with the communication apparatus 100 and target receivers 200 in a connection procedure. The connection may be established by implementing known or future developed method whose details are omitted herein.

At step ST702, the communication apparatus 100 connects with the target receivers 200 at a connection procedure. The connection may be established by implementing known or future developed method whose details are omitted herein.

At step ST703, the base station 300 allocates resource blocks for transmission from the communication apparatus 100 to the target receivers 200. This step may be similar to that described above, and detail thereof is not repeated. And at step S704, the base station 300 allocates resource blocks for the target receivers.

At step ST705, the communication apparatus 100 determines respective priories of the target receivers. This step may be similar to that described in step 220, and in combination with step 210 with references to FIG. 2A-FIG. 3B. The details thereof are omitted for the purpose of clarity and brevity.

At step ST706, the communication apparatus 100 assigns power for transmitting data to the target receivers. The total power to be assigned may be calculated according to equations (3-1)-(3-3), and the communication apparatus 100 assigns power for transmitting the data in a similar way as described above, and the details thereof are omitted for the purpose of clarity and brevity.

At step ST707, the communication apparatus 100 transmits data with the assigned power to the target receivers. As the power assigned for each allocated resource block are even, the PSD difference for each target receiver is eliminated thereof, which protects the communication apparatus 100 from affecting the RF implementation while ensuring a certain received power at each target receiver.

In an embodiment, the communication apparatus includes a base station 300, and the target receivers 200 include at least one of remote UE and/or at least one base station. And a relay UE is used to relay data from the base station to the target receivers.

Figure 8:
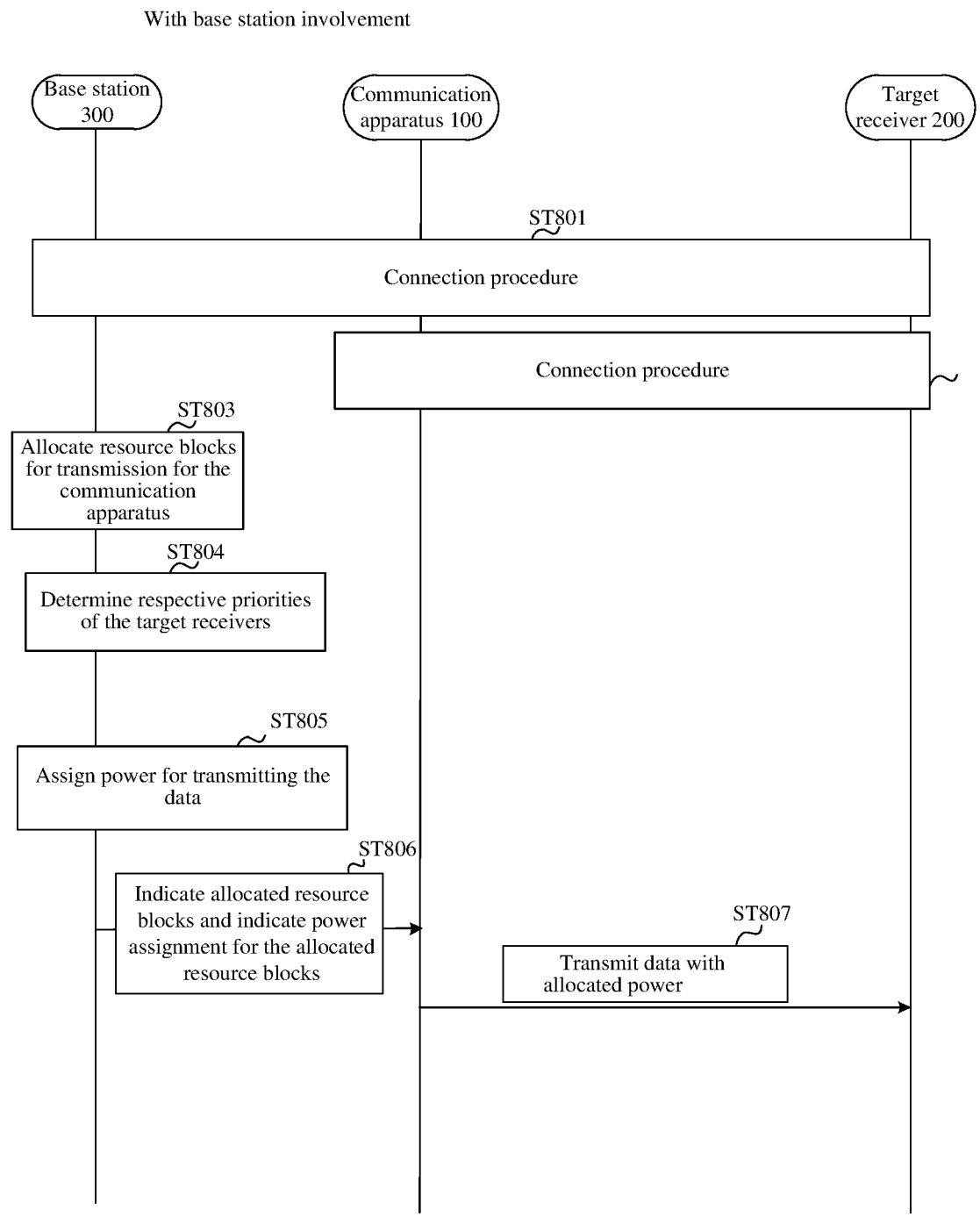
FIG. 8 schematically shows an example of a flowchart of communication between a communication apparatus and a target receiver when a base station is involved according to another embodiment of the present disclosure.

FIG. 8 schematically shows an example of a flowchart of communication between a communication apparatus and a target receiver when a base station is involved according to another embodiment of the present disclosure.

The difference between FIG. 8 and FIG. 7 lies in that the base station performs the function of the communication apparatus as described above, that is, the steps of determining the priorities of the target receivers and the step of assigning power for data are performed by the base stations 300.

More specifically, at step ST801, the base station 300 connects with the communication apparatus 100 and target receivers 200 in a connection procedure. The connection may be established by implementing known or future developed method whose details are omitted herein.

At step ST802, the communication apparatus 100 connects with the target receivers 200 at a connection procedure. The connection may be established by implementing known or future developed method whose details are omitted herein.

As step ST803, the base station 300 allocates resource blocks for transmission for the communication apparatus 100. The schedule procedure can be performed by implementing known or future developed method of which details are omitted herein.

At step ST804, the base station 300 determines respective priories of the target receivers. This step may be similar to that described in step 220, and in combination with step 210 with references to FIG. 2A-FIG. 3B. The details thereof are omitted for the purpose of clarity and brevity.

At step ST805, the base station 300 assigns power for transmitting data to the target receivers. The total power to be assigned may be calculated according to equations (3-1)-(3-3), and the base station 300 assigns power for transmitting the data in a similar way as described above, and the details thereof are omitted for the purpose of clarity and brevity.

At step ST806, the base station 300 indicates to the communication apparatus 100, the allocated resource block for transmission, and indicates to the communication apparatus 100, power assignments for transmitting data in the allocated resource blocks to the target receivers.

And at step ST807, the communication apparatus 100 transmit data with assigned power.

Figure 9:
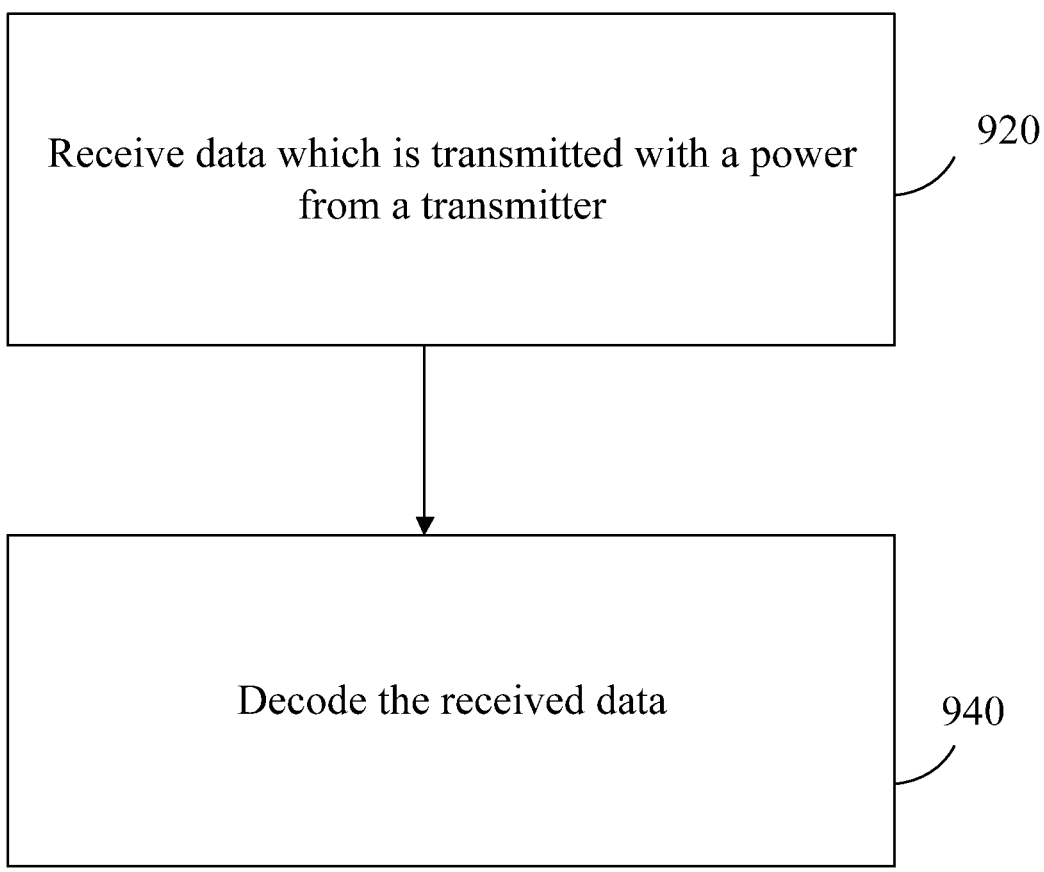
FIG. 9 schematically shows an example of a communication method, at a communication apparatus, according to an embodiment of the present disclosure.

FIG. 9 schematically shows an example of a communication method, at a communication apparatus, according to an embodiment of the present disclosure. Although specific steps are disclosed in FIG. 9, such steps are examples. That is, the present disclosure is well suited to performing various other steps or variations of the steps recited in FIG. 9.

In an embodiment, the communication apparatus may be a remote UE, a base station, or a combination thereof.

The communication apparatus may include a receiver and a circuitry.

At step S920, the receiver of the communication apparatus receive data which is transmitted with a power from a transmitter. At step S940, the circuitry of the communication apparatus decode the received data, wherein the communication apparatus is one of multiple target receivers, to which the data is transmitted from the transmitter and respective priorities of which are determined by the transmitter, and the power is assigned at least according to a power loss feature related to a particular target receiver of which the priority is the highest or is higher than a power threshold.

In an embodiment, the communication method further includes: estimating power spectral densities (PSDs) for transmitting the data to the respective target receivers; and estimating PSD differences between the estimated PSDs, wherein the respective priorities of the target receivers is determined in response to that at least one of the calculated estimated PSD differences is larger than a PSD threshold.

In one embodiment, the communication method further includes: determining the respective priorities of the target receivers in response to that at least one of distance differences between the transmitter and the respective target receivers is larger than a distance difference threshold.

In an embodiment, the PSD threshold or the distance difference threshold is configured or preconfigured or defined based on power assignment capability of the transmitter.

In an embodiment, the communication method further includes: determining the respective priorities of the target receivers corresponding to the estimated PSD for the target receiver.

In an embodiment, the communication method further includes: determining the respective priorities of a plurality of target receivers corresponding to a distance between the communication apparatus and the transmitter.

In an embodiment, the communication method further includes: determining the respective priorities of a plurality of target receivers corresponding to a distance between the communication apparatus and the transmitter.

In an embodiment, the communication method further includes: determining the respective priorities of a plurality of target receivers corresponding to QoS related priority of the data transmitted to the communication apparatus.

In an embodiment, the communication method further includes: assigning a total power for transmitting the data lower than a power limit calculated by a power loss feature related to a base station.

In an embodiment, wherein the power loss feature related to the particular target receiver comprises pathloss indicating power consumption on a path between the particular target receiver and the transmitter, and the power loss feature related to the base station includes pathloss indicating power consumption on a path between the transmitter and the base station.

In an embodiment, the communication method further includes: allocating resource blocks to the data transmitted to the communication apparatus subframe by subframe.

In an embodiment, wherein the transmitter is a relay user equipment (UE), and the communication apparatus comprises at least some of remote UEs and base stations.

In an embodiment, wherein the transmitter is a base station for assigning power for a relay UE to transmit the data to the communication apparatus, and the communication apparatus comprises are at least some of remote UEs and base stations.

The communication method as disclosed in FIG. 9 may be illustrated with references to the above descriptions, and the details are omitted here for brevity.

Figure 10:
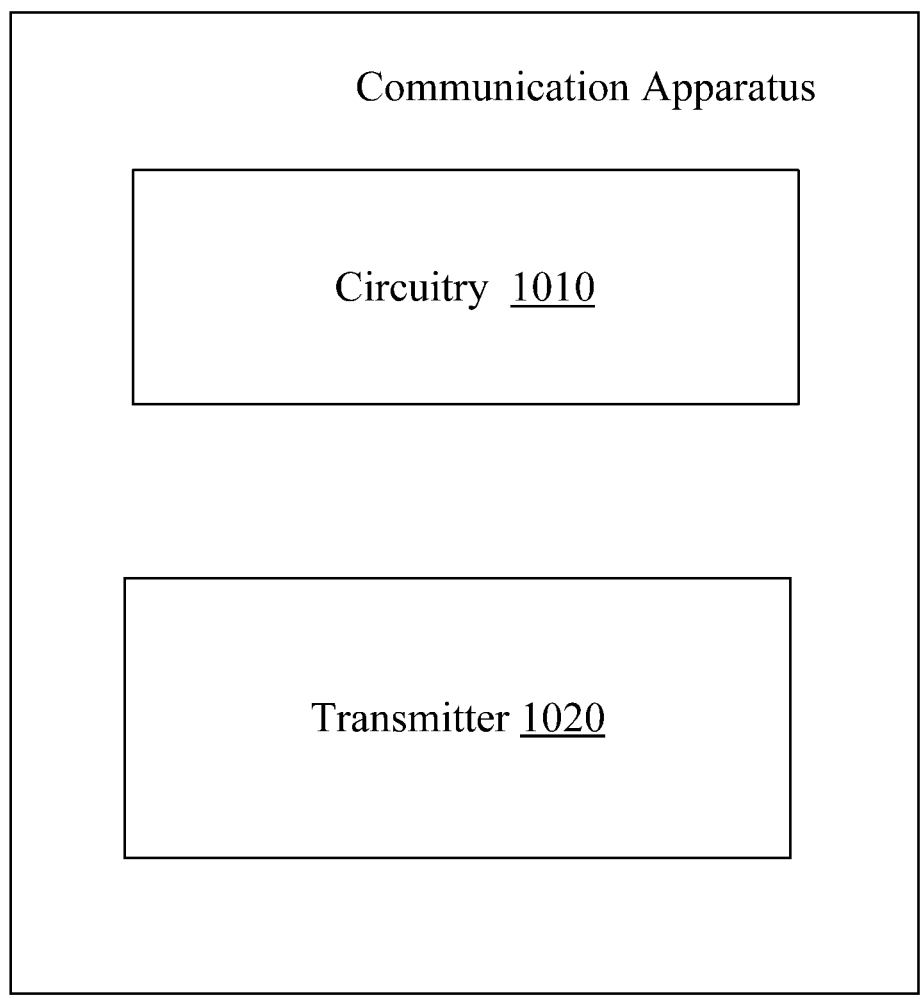
FIG. 10 schematically shows an example of a communication apparatus according to an embodiment of the present disclosure.

FIG. 10 schematically shows an example of a communication apparatus 1000 according to an embodiment of the present disclosure.

In an embodiment, the communication apparatus 1000 includes a circuitry 1010 and a transmitter 1020. The circuitry 1010 may perform the step 210, step 220, and step 240 as mentioned above. The transmitter 1020 may perform the step 260 as mentioned above.

In particular, the circuitry 1010 determine respective priorities of multiple target receivers to which data is transmitted, and assigns power for transmitting the data at least according to a power loss feature related to a particular target receiver of which the priority is the highest or is higher than a power threshold. The transmitter 1020 transmits, to the plurality of target receivers, the data with the assigned power.

In an embodiment, the circuitry 1010 of the communication apparatus 1000 further estimates power spectral densities (PSDs) for transmitting the data to the target receivers respectively and calculate estimated PSD differences between the estimated PSDs, and wherein the circuitry 1010 is operative to start to determine respective priorities of the multiple target receivers in response to that at least one of the calculated estimated PSD differences is larger than a PSD threshold. The detailed procedures for determining if at least one of the calculated estimated PSD differences is larger than a PSD threshold has been described with reference to FIG. 3A to FIG. 3B, and details are omitted herein for brevity.

In an embodiment, the circuitry 1010 starts to determine respective priorities of the target receivers in response to that at least one of distance differences is larger than a distance difference threshold. The detailed procedures for determining if at least one of the calculated estimated PSD differences is larger than a PSD threshold has been described with reference to FIG. 2A to FIG. 3B, and details are omitted herein for brevity.

In an embodiment, the PSD threshold or the distance difference threshold is configured or preconfigured or defined based on power assignment capability of the communication apparatus.

In an embodiment, the circuitry 1010 determines the priority of the target receiver corresponding to the estimated PSD for the target receiver. In an embodiment, the circuitry 1010 determines the priority of the target receiver corresponding to a distance between the communication apparatus and the target receiver. In an embodiment, the circuitry 1010 determines the priority of the target receiver corresponding to a QoS related priority of the data transmitted to the target receiver. As the details have been described in combination with FIG. 2A to FIG. 3B, details are omitted herein for brevity.

In an embodiment, the circuitry 1010 assigns a total power for transmitting the data lower than a power limit calculated by a power loss feature related to a base station. The total power can be calculated in accordance with equations (3-1)-(3-3) as described above.

In an embodiment, the power loss feature related to the particular target receiver includes pathloss indicating power consumption on a path between the communication apparatus and the particular target receiver, and the power loss feature related to the base station includes pathloss indicating power consumption on a path between the base station and the communication apparatus.

In an embodiment, resource blocks are allocated to the target receivers subframe by subframe.

In an embodiment, the communication apparatus 1000 is relay user equipment (UE), and the target receivers are at least some of remote UEs and base stations.

In another embodiment, the communication apparatus 1000 is a base station for assigning power for a relay UE to transmit the data to the target receivers, and the target receivers are at least some of remote UEs and base stations.

Figure 11:
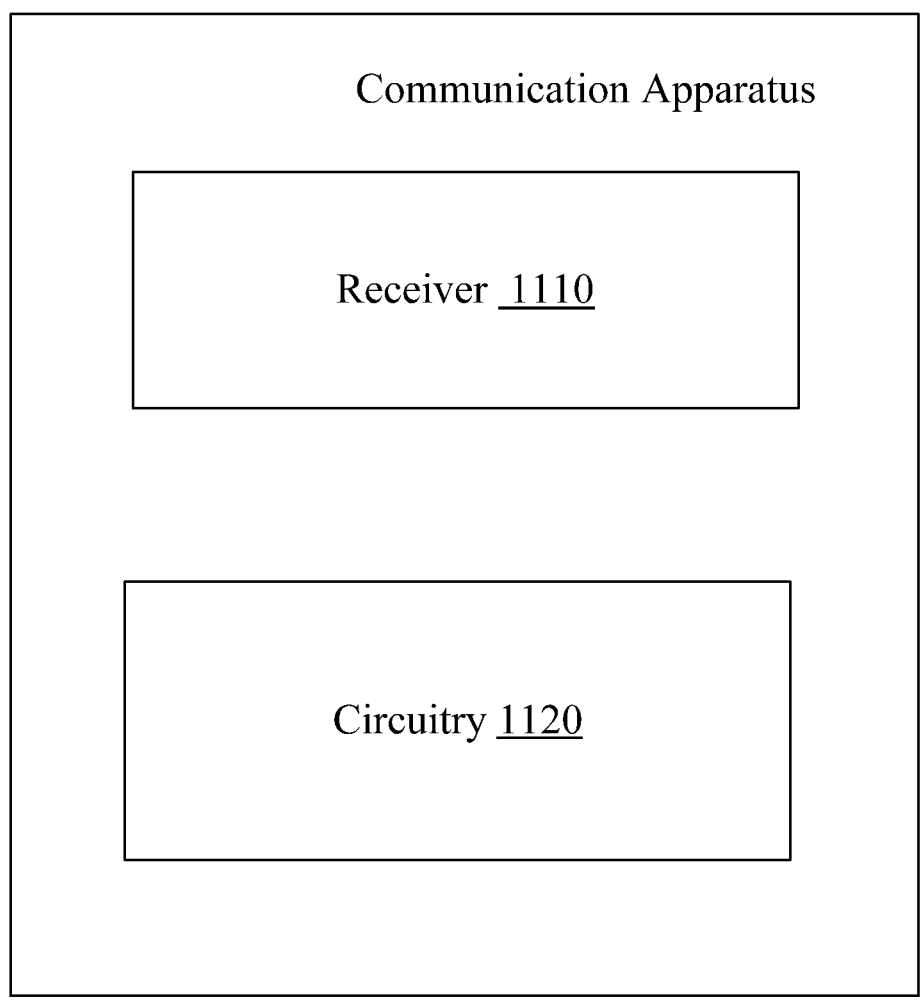
FIG. 11 schematically shows an example of a communication apparatus according to another embodiment of the present disclosure.

FIG. 11 schematically shows an example of a communication apparatus 1100 according to another embodiment of the present disclosure.

As shown in FIG. 11, the communication apparatus 1100 includes a receiver 1110 and a circuitry 1120.

The receiver 1110 receives data which is transmitted with a power from a transmitter. The circuitry 1120 decodes the received data, wherein the communication apparatus 1110 is one of multiple target receivers, to which the data is transmitted from the transmitter and respective priorities of which are determined by the transmitter, and the power is assigned at least according to a power loss feature related to a particular target receiver of which the priority is the highest or is higher than a power threshold.

In an embodiment, power spectral densities (PSDs) for transmitting the data to the respective target receivers is estimated and the estimated PSD differences between the estimated PSDs is calculated, wherein respective priorities of the multiple target receivers is started in response to that at least one of the calculated estimated PSD differences is larger than a PSD threshold.

In an embodiment, wherein respective priorities of the plurality of target receivers is determined in response to that at least one of distance differences between the transmitter and the respective target receivers is larger than a distance difference threshold.

In an embodiment, the PSD threshold or the distance difference threshold may be configured or preconfigured or defined based on power assignment capability of the transmitter.

In an embodiment, respective priorities of the target receivers are determined corresponding to the estimated PSD for the target receiver.

In an embodiment, the respective priorities of the plurality of target receivers is determined corresponding to a distance between the transmitter and the target receiver.

In an embodiment, wherein the respective priorities of the plurality of target receivers is determined corresponding to a QoS related priority of the data transmitted to the target receiver.

In an embodiment, a total power assigned for transmitting the data is lower than a power limit calculated by a power loss feature related to a base station.

In an embodiment, wherein the power loss feature related to the particular target receiver includes pathloss indicating power consumption on a path between the transmitter and the particular target receiver, and the power loss feature related to the base station includes pathloss indicating power consumption on a path between the base station and the transmitter.

In an embodiment, resource blocks are allocated to the target receivers subframe by subframe.

In an embodiment, wherein the transmitter is a relay user equipment (UE), and the communication apparatus includes at least some of remote UEs and base stations.

In an embodiment, wherein the transmitter is a base station for assigning power for a relay UE to transmit the data to the communication apparatus, and the communication apparatus includes at least some of remote UEs and base stations.

Advantageously, as the power assigned for each resource block are even, the PSD difference for each target receiver is eliminated thereof, which protects the communication apparatus from affecting the RF implementation while ensuring a certain received power at each target receiver.

The above description is on illustrative embodiments of the present disclosure, but not for limitation.

In addition, embodiments of the present disclosure can at least provide the following subject matters.

(1). A communication apparatus comprising:

a determining circuitry operative to determine respective priorities of a plurality of target receivers to which data is transmitted and to assign power for transmitting the data at least according to a power loss feature related to a particular target receiver of which the priority is the highest or is higher than a power threshold; and a transmitter operative to transmit, to the plurality of target receivers, the data with the assigned power.

(2). The communication apparatus according to claim (1), wherein the circuitry is operative to estimate power spectral densities (PSDs) for transmitting the data to respective target receivers and calculate estimated PSD differences between the estimated PSDs;

wherein the circuitry is operative to start to determine respective priorities of the plurality of target receivers in response to that at least one of the calculated estimated PSD differences is larger than a PSD threshold.

(3). The communication apparatus according to claim (1), wherein the circuitry is operative to start to determine respective priorities of the plurality of target receivers in response to that at least one of distance differences between the communication apparatus and the respective target receivers is larger than a distance difference threshold.

(4). The communication apparatus according to claim (2) or (3), wherein the PSD threshold or the distance difference threshold is configured or preconfigured or defined based on power assignment capability of the communication apparatus.

(5). The communication apparatus according to claim (2), wherein the circuitry is operative to:

determine the priority of the target receiver corresponding to the estimated PSD for the target receiver.

(6). The communication apparatus according to claim (3), wherein the circuitry is operative to:

determine the priority of the target receiver corresponding to a distance between the communication apparatus and the target receiver.

(7). The communication apparatus according to claim (1), wherein the circuitry is operative to:

determine the priority of the target receiver corresponding to a QoS related priority of the data transmitted to the target receiver.

(8). The communication apparatus according to claim (1), wherein the circuitry is operative to assign a total power for transmitting the data lower than a power limit calculated by a power loss feature related to a base station.

(9). The communication apparatus according to claim (8), wherein the power loss feature related to the particular target receiver includes pathloss indicating power consumption on a path between the communication apparatus and the particular target receiver, and the power loss feature related to the base station includes pathloss indicating power consumption on a path between the base station and the communication apparatus.

(10). The communication apparatus according to claim (1), wherein resource blocks are allocated to the data transmitted to the target receivers subframe by subframe.

(11). The communication apparatus according to claim (1), wherein the communication apparatus is a relay user equipment (UE), and the target receivers are at least some of remote UEs and base stations.

(12). The communication apparatus according to claim (1), wherein the communication apparatus is a base station for assigning power for a relay UE to transmit the resource blocks to the target receivers, and the target receivers are at least some of remote UEs and base stations.

(13). A power control method, at a communication apparatus, comprising:

determining respective priorities of a plurality of target receivers to which data is transmitted;

assigning power for transmitting the data at least according to a power loss feature related to a particular target receiver of which the priority is the highest or is higher than a power threshold; and transmitting, to the plurality of target receivers, the data with the assigned power.

(14). The method according to claim (13), further comprising:

estimating power spectral densities (PSDs) for transmitting the data to the respective target receivers; and estimating PSD differences between the estimated PSDs, wherein the step of determining respective priorities of the plurality of target receivers is started in response to that at least one of the calculated estimated PSD differences is larger than a PSD threshold.

(15). The method according to claim (13), wherein the step of determining respective priorities of the plurality of target receivers is started in response to that at least one of distance differences between the communication apparatus and the respective target receivers is larger than a distance difference threshold.

(16). The method according to claim (13) or (14), wherein the PSD threshold or the distance difference threshold is configured or preconfigured or defined based on power assignment capability of the communication apparatus.

(17). The method according to claim (14) wherein the step of determining respective priorities of a plurality of target receivers comprises:

determining the priority of the target receiver corresponding to the estimated PSD for the target receiver.

(18). The method according to claim (15), wherein the step of determining respective priorities of a plurality of target receivers comprises:

determining the priority of the target receiver corresponding to a distance between the communication apparatus and the target receiver.

(19). The method according to claim (13), wherein the step of determining respective priorities of a plurality of target receivers comprises:

determining the priority of the target receiver corresponding to QoS related priority of the data transmitted to the target receiver.

(20). The method according to claim (13), further comprising:

assigning a total power for transmitting the data lower than a power limit calculated by a power loss feature related to a base station.

(21). The method according to claim (20), wherein the power loss feature related to the particular target receiver includes pathloss indicating power consumption on a path between the communication apparatus and the particular target receiver, and the power loss feature related to the base station includes pathloss indicating power consumption on a path between the base station and the communication apparatus.

(22). The method according to claim (13), further comprising:

allocating the resource blocks to data transmitted to the target receivers subframe by subframe.

(23). The method according to claim (13), wherein the communication apparatus is a relay user equipment (UE), and the target receivers are at least some of remote UEs and base stations.

(24). The method according to claim (13), wherein the communication apparatus is a base station for assigning power for a relay UE to transmit the resource blocks to the target receivers, and the target receivers are at least some of remote UEs and base stations.

(25). A communication apparatus, comprising:

a receiver, operative to receive data which is transmitted with a power from a transmitter; and a circuitry, operative to decode the received data, wherein the communication apparatus is one of a plurality of target receivers, to which the data is transmitted from the transmitter and respective priorities of which are determined by the transmitter, and the power is assigned at least according to a power loss feature related to a particular target receiver of which the priority is the highest or is higher than a power threshold.

(26). The communication system according to claim (25), wherein power spectral densities (PSDs) for transmitting the data to respective target receivers is estimated and the estimated PSD differences between the estimated PSDs is calculated, wherein respective priorities of the plurality of target receivers is determined in response to that at least one of the calculated estimated PSD differences is larger than a PSD threshold.

(27). The communication system according to claim (25), wherein respective priorities of the plurality of target receivers is determined in response to that at least one of distance differences between the transmitter and the respective target receivers is larger than a distance difference threshold.

(28). The communication system according to claim (26) or (27), wherein the PSD threshold or the distance difference threshold is configured or preconfigured or defined based on power assignment capability of the transmitter.

(29). The communication system according to claim (26), wherein the respective priorities of the plurality of target receivers are determined corresponding to the estimated PSD for the target receiver.

(30). The communication system according to claim (27), wherein the respective priorities of the plurality of target receivers is determined corresponding to a distance between the transmitter and the target receiver.

(31). The communication system according to claim (25), wherein the respective priorities of the plurality of target receivers is determined corresponding to a QoS related priority of the data transmitted to the target receiver.

(32). The communication apparatus according to claim (25), wherein a total power assigned for transmitting the data is lower than a power limit calculated by a power loss feature related to a base station.

(33). The communication apparatus according to claim (32), wherein the power loss feature related to the the particular target receiver includes pathloss indicating power consumption on a path between the particular target receiver and the transmitter, and the power loss feature related to the base station includes pathloss indicating power consumption on a path between the base station and the transmitter.

(34). The communication system according to claim (25), wherein resource blocks are allocated to the data transmitted to the communication apparatus subframe by subframe.

(35). The communication system according to claim (25), wherein the transmitter is a relay user equipment (UE), and the communication apparatus comprises at least some of remote UEs and base stations.

(36). The communication apparatus according to claim (25), wherein the transmitter is a base station for assigning power for a relay UE to transmit the data to the communication apparatus, and the communication apparatus comprises at least some of remote UEs and base stations.

(37). A communication method, at a communication apparatus, comprising:
receiving data which is transmitted with a power from a transmitter; and;
decoding the received data,
wherein the communication apparatus is one of a plurality of target receivers, to which the data is transmitted from the transmitter and respective priorities of which are determined by the transmitter, and the power is assigned at least according to a power loss feature related to a particular target receiver of which the priority is the highest or is higher than a power threshold.

(38). The communication method of claim (37), further comprising:
estimating power spectral densities (PSDs) for transmitting the data to the respective target receivers;
estimating PSD differences between the estimated PSDs; and
determining the respective priorities of the plurality of target receivers in response to that at least one of the calculated estimated PSD differences is larger than a PSD threshold.

(39). The communication method of claim (37), further comprising:
determining the respective priorities of the plurality of target receivers in response to that at least one of distance differences between the transmitter and the respective target receivers is larger than a distance difference threshold.

(40). The communication method according to claim (37) or (38), wherein the PSD threshold or the distance difference threshold as configured or preconfigured or defined based on power assignment capability of the transmitter.

(41). The communication method according to claim (38), further comprising:
determining the respective priorities of a plurality of target receivers corresponding to the estimated PSD for the target receiver.

(42). The communication method according to claim (39), further comprising:
determining the respective priorities of a plurality of target receivers corresponding to a distance between the communication apparatus and the transmitter.

(43). The communication method according to claim (37), further comprising:
determining the respective priorities of a plurality of target receivers corresponding to QoS related priority of the data transmitted to the communication apparatus.

(44). The communication method according to claim (37), further comprising:
assigning a total power for transmitting the data lower than a power limit calculated by a power loss feature related to a base station.

(45). The communication method according to claim (44), wherein the power loss feature comprises pathloss indicating power consumption on a path between the particular target receiver and the transmitter, and the power loss feature related to the base station includes pathloss indicating power consumption on a path between the transmitter and the base station.

(46). The communication method according to claim (37), further comprising:
allocating resource blocks to the data transmitted to the communication apparatus subframe by subframe.

(47). The communication method according to claim (37), wherein the transmitter is a relay user equipment (UE), and the communication apparatus comprises at least some of remote UEs and base stations.

(48). The communication method according to claim (37), wherein the transmitter is a base station for assigning power for a relay UE to transmit the data to the communication apparatus, and the communication apparatus comprises are at least some of remote UEs and base stations.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Examples of several embodiments of the present disclosure have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present disclosure. For example, it will be readily appreciated that although the above embodiments are described with reference to parts of a The 3rd Generation Partnership Project (3GPP) network, an embodiment of the present disclosure will also be applicable to like networks, such as a successor of the 3GPP network, having like functional components.

Therefore, in particular, the terms 3GPP and associated or related terms used in the above description and in the enclosed drawings and any appended claims now or in the future are to be interpreted accordingly.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Notably, modifications and other embodiments of the disclosed disclosure(s) will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A communication apparatus comprising:
   a circuitry which, in operation, determines respective priorities of a plurality of target receivers to which data are transmitted, and assigns power for transmitting the data at least according to a power loss feature related to a particular target receiver of which the priority is the highest or the power is higher than a power threshold; and
   a transmitter which, in operation, transmits, to the plurality of target receivers, the data with the assigned power, wherein the data are simultaneously transmitted to the plurality of target receivers in a subframe including at least a plurality of first resource blocks allocated to only a first one of the plurality of target receivers and a plurality of second resource blocks allocated to only a second one of the plurality of target receivers.

2. The communication apparatus according to claim 1, wherein the circuitry is operative to estimate power spectral densities (PSDs) for transmitting the data to respective target receivers and calculate estimated PSD differences between the estimated PSDs;
   wherein the circuitry is operative to start to determine respective priorities of the plurality of target receivers in response to that at least one of the calculated estimated PSD differences is larger than a PSD threshold.

3. The communication apparatus according to claim 1, wherein the circuitry is operative to start to determine respective priorities of the plurality of target receivers in response to that at least one of distance differences between the communication apparatus and the respective target receivers is larger than a distance difference threshold.

4. The communication apparatus according to claim 2, wherein the PSD threshold or the distance difference threshold is configured or preconfigured or defined based on power assignment capability of the communication apparatus.

5. The communication apparatus according to claim 2, wherein the circuitry is operative to:
   determine the priority of the target receiver corresponding to the estimated PSD for the target receiver.

6. The communication apparatus according to claim 3, wherein the circuitry is operative to:
   determine the priority of the target receiver corresponding to a distance between the communication apparatus and the target receiver.

7. The communication apparatus according to claim 1, wherein the circuitry is operative to:
   determine the priority of the target receiver corresponding to a QoS related priority of the data transmitted to the target receiver.

8. The communication apparatus according to claim 1, wherein the circuitry is operative to assign a total power for transmitting the data lower than a power limit calculated by a power loss feature related to a base station.

9. The communication apparatus according to claim 8, wherein the power loss feature related to the particular target receiver comprises pathloss indicating power consumption on a path between the communication apparatus and the particular target receiver, and the power loss feature related to the base station comprises pathloss indicating power consumption on a path between the base station and the communication apparatus.

10. The communication apparatus according to claim 1, wherein resource blocks are allocated to the data transmitted to the target receivers subframe by subframe.

11. The communication apparatus according to claim 1, wherein the communication apparatus is a relay user equipment (UE), and the target receivers are at least some of remote UEs and base stations.

12. The communication apparatus according to claim 1, wherein the communication apparatus is a base station for assigning power for a relay UE to transmit the data to the target receivers, and the target receivers are at least some of remote UEs and base stations.

13. A power control method, at a communication apparatus, comprising:
   determining respective priorities of a plurality of target receivers to which data are transmitted;
   assigning power for transmitting the data at least according to a power loss feature related to a particular target receiver of which the priority is the highest or the power is higher than a power threshold; and
   transmitting, to the plurality of target receivers, the data with the assigned power, wherein the data are simultaneously transmitted to the plurality of target receivers in a subframe including at least a plurality of first resource blocks allocated to only a first one of the plurality of target receivers and a plurality of second resource blocks allocated to only a second one of the plurality of target receivers.

14. The method according to claim 13, further comprising:
   estimating power spectral densities (PSDs) for transmitting the data to the respective target receivers; and
   estimating PSD differences between the estimated PSDs;
   wherein the step of determining respective priorities of the plurality of target receivers is started in response to that at least one of the calculated estimated PSD differences is larger than a PSD threshold.

15. The method according to claim 13, wherein the step of determining respective priorities of the plurality of target receivers is started in response to that at least one of distance differences between the communication apparatus and the respective target receivers is larger than a distance difference threshold.

16. The method according to claim 14 wherein the step of determining respective priorities of a plurality of target receivers comprises:

determining the priority of the target receiver corresponding to the estimated PSD for the target receiver.

17. The method according to claim 15, wherein the step of determining respective priorities of a plurality of target receivers comprises:
determining the priority of the target receiver corresponding to a distance between the communication apparatus and the target receiver.

18. The method according to claim 13, wherein the step of determining respective priorities of a plurality of target receivers comprises:
determining the priority of the target receiver corresponding to QoS related priority of the data transmitted to the target receiver.

19. The method according to claim 13, further comprising:
assigning a total power for transmitting the data lower than a power limit calculated by a power loss feature related to a base station.

20. A communication apparatus, comprising:
a receiver which, in operation, receives data which is transmitted with a power from a transmitter; and
a circuitry which, in operation, decodes the received data,
wherein the communication apparatus is one of a plurality of target receivers, to which the data are transmitted from the transmitter and respective priorities of which are determined by the transmitter, and the power is assigned at least according to a power loss feature related to a particular target receiver of which the priority is the highest or the power is higher than a power threshold, wherein the data are simultaneously transmitted to the plurality of target receivers in a subframe including at least a plurality of first resource blocks allocated to only a first one of the plurality of target receivers and a plurality of second resource blocks allocated to only a second one of the plurality of target receivers.

* * * * *